United States Patent [19]

Yamamoto et al.

[11] Patent Number: 5,187,229
[45] Date of Patent: Feb. 16, 1993

[54] PIGMENT DISPERSING AGENT

[75] Inventors: Toshio Yamamoto; Yoshiaki Matsukura, both of Yokohama; Osamu Ohe, Tokyo; Hisao Ogawa, Zushi; Masahiro Ishidoya, Kamakura; Yoshiro Matsubara, Yokohama, all of Japan

[73] Assignee: Nippon Oil and Fats Company, Ltd., Japan

[21] Appl. No.: 806,263

[22] Filed: Dec. 13, 1991

Related U.S. Application Data

[62] Division of Ser. No. 395,495, Aug. 18, 1989, Pat. No. 5,100,969.

[30] Foreign Application Priority Data

Aug. 26, 1988 [JP] Japan .................. 63-210789
May 12, 1989 [JP] Japan .................. 1-119666
May 12, 1989 [JP] Japan .................. 1-119667
Jun. 20, 1989 [JP] Japan .................. 1-155649
Jun. 20, 1989 [JP] Japan .................. 1-155650
Jul. 19, 1989 [JP] Japan .................. 1-184497

[51] Int. Cl.$^5$ .............................. C08F 8/32
[52] U.S. Cl. ........................ 525/123; 525/127
[58] Field of Search ........................ 525/123

[56] References Cited

U.S. PATENT DOCUMENTS

| 3,562,102 | 2/1971 | Gaertner . | |
|---|---|---|---|
| 3,668,183 | 6/1972 | Hoy et al. . | |
| 3,684,771 | 8/1972 | Braun . | |
| 4,032,698 | 6/1977 | Ashe . | |
| 4,647,647 | 3/1987 | Haubennestel et al. . | |
| 4,857,580 | 8/1989 | Patzschke et al. | 525/380 |
| 4,882,391 | 11/1989 | Briudopke et al. | 525/327.2 |
| 4,987,186 | 1/1991 | Akiyama et al. | 525/328.6 |

FOREIGN PATENT DOCUMENTS

| 0180051 | 5/1986 | European Pat. Off. . |
|---|---|---|
| 208041 | 1/1987 | European Pat. Off. . |
| 0295789 | 12/1988 | European Pat. Off. . |
| 51-18736 | 2/1976 | Japan . |
| 1339930 | 12/1973 | United Kingdom . |

OTHER PUBLICATIONS

Progress in organic coatings, vol. 5 (1977), pp. 237-243.

*Primary Examiner*—Bernard Lipman
*Attorney, Agent, or Firm*—Parkhurst, Wendel & Rossi

[57] ABSTRACT

A pigment dispersing agent for paints is a combination of particular amine compound and particular acrylic copolymer or a combination of particular amine compound, particular acrylic copolymer and particular polyester resin. This pigment dispersing agent is applicable to both acrylic resin series paints and polyester resin series paints.

4 Claims, No Drawings

PIGMENT DISPERSING AGENT

This is a division of application Ser. No. 07/395,495 filed Aug. 18, 1989, now U.S. Pat. No. 5,100,969.

FIELD OF THE INVENTION

1. Field of the Invention

This invention relates to a pigment dispersing agent used when a pigment is mixed with a coating composition in the manufacture of paints.

2. Related Art Statement

In the manufacture of paints, it is important to mix the pigment with the coating composition. In this case, the pigment to be usually used in the paint is dispersed into only a part of a vehicle constituting the paint together with a proper solvent, diluent or other additive by means of a mill used in the paint industry to obtain a dispersion paste. Then, this paste is mixed with the remaining amount of the vehicle and other necessary additives to obtain a pigment dispersing composition as a paint. However, the greatest problem of such a pigment dispersing composition lies in that the pigment particles are apt to be agglomerated. As a result, it is known to cause unfavorable phenomena such as decrease of paint stability, occurrence of troubles in the painting, reductions of color strength, gloss and distinctness of image of the finally obtained paint film, flooding, floating, color change with time and the like. Such a phenomenon that the pigment particles are apt to be agglomerated is explained by London—van der Waals force attracting the particles to each other. In order to overcome this attracting force, it is necessary to provide an adsorption layer onto the surface of the particle, and consequently various methods are attempted. For instance, there are known (1) a method of dispersing the pigment by using non-ionic, anionic or cationic surfactant, or a wetting agent such as aliphatic polyvalent carboxylic acid or the like as an assistant; (2) a method of mixing the pigment with a certain substituted derivative of the pigment as disclosed in Japanese Patent laid open No. 51-18,736; (3) a method of dispersing the pigment by using a high molecular weight dispersing agent obtained by the bonding of a basic substance and a polyester compound as disclosed in Japanese Patent laid open No. 60-166,318 and No. 61-174,939; (4) a method of dispersing the pigment by using a high molecular weight dispersing agent obtained through the bonding of a basic substance and an acrylic polymer as disclosed in Japanese Patent laid open No. 46-7,294; and the like.

In the dispersion assistant used in the method (1), however, the adsorption layer adsorbed on the particle surface is thin and does not develop the satisfactory stabilizing effect and hence the pigment dispersing performances are not observed. The pigment derivative used in the method (2) is naturally colored, so that it can not generally be used for various pigments. The basic thought of the dispersing agent used in the methods (3) and (4) is a technical idea of making a block structure from a polymer portion capable of solvating with a solvent and an anchor portion adsorbed on the pigment as described by A. Topham in Progress in Organic Coatings, vol. 5, (1977) pp 237-243. In this technique, it is important that the polymer portion capable of solvating with the solvent is excellent in the compatibility with a resin added as a film forming component of the paint film and the adsorption state of the dispersing agent to the pigment is tail-like. If the polymer portion capable of solvating with the solvent is poor in the compatibility with the resin added as the film forming component of the paint film, the solvated polymer portion agglomerates to cause the degradation of pigment dispersing performances.

In the dispersing agent used in the method (3), therefore, when the compatibility between the dispersing agent and the dispersion vehicle is good, the remarkable improvement of the pigment dispersing performances is observed, but when using the dispersion vehicle having a poor compatibility, the protective layer for the dispersing agent adsorbed on the particle surface agglomerates to undesirably degrade the pigment dispersing performances. Especially, since the dispersing agent consists mainly of polyester compound, it is poor in compatibility with an acrylic resin or the like important as a painting resin, so that it is difficult to obtain good pigment dispersing performances in case of acrylic resin series paints. Furthermore, the polyester portion of this dispersing agent has no functional group reacting with a curing agent in the paint such as melamine resin, urea resin, polyisocyanate resin or the like, it acts as a plasticizer in the paint film to cause degradation of weather resistance, humidity resistance and the like in the paint film and the local floating of the pigment dispersing agent onto the surface of the paint film after the curing of the paint or so-called bleeding phenomenon, whereby the gloss and hardness are lowered. Moreover, when the dispersing agent is used for multilayer coating, to cause adhesion trouble is caused between the paint films due to the presence of the bled component and the like.

On the other hand, the pigment dispersing agent used in the method (4) serves for ordinary acrylic resin series paints because acrylic resin is used as a polymer portion. However, the polymer portion has no reaction point such as hydroxyl group, carboxyl group or the like reacting with a crosslinking agent like the method (3) and is not chemically fixed in the paint film, so that there is a problem of damaging the quality of paint film due to the plasticizer action as previously mentioned.

Furthermore, in the method (4), all of the polymer portion is comprised of acrylic resin, so that it is difficult to be used for polyester resin series paints.

In both methods (3) and (4), since the polymer portion has no polar group such as hydroxyl group, carboxyl group or the like, it is poor in compatibility with a resin having a relatively high polarity, so that it is difficult to utilize these methods in paints consisting mainly of such a resin and hence the application range thereof is critical.

SUMMARY OF THE INVENTION

Under the above circumstances, the inventors have made studies with respect to (1) a pigment dispersing agent capable of widely utilizing in acrylic resin series paints usually used in the art and simultaneously fixing in the paint film through the curing reaction with an amino resin such as melamine resin, urea resin and also with polyisocyanate resin or the like; and (2) a pigment dispersing agent capable of utilizing in polyester resin series paints in addition to the acrylic resin series paint and fixing in the paint film through the reaction with a crosslinking agent such as amino resin, polyisocyanate resin or the like, and as a result the invention has been accomplished.

That is, the invention provides pigment dispersing agents of the following first and second inventions.

I. A pigment dispersing agent consisting of a product obtained by reacting the following component $A_1$ with the following component B at a mol ratio of component $A_1$ to component B of 1:1-1:40.

Component $A_1$: an amine compound containing one or more amino group and/or imino group in its molecule and having a weight average molecular weight of 60-30,000 and an amine value of 50-2,000 mg KOH/g;

Component B: an acrylic copolymer having a weight average molecular weight of 2,000-100,000 and a hydroxyl value of 5-200 and containing one of glycidyl group

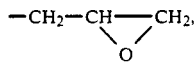

component $B_1$), acetoacetoxy group

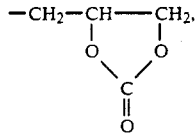

component $B_3$), in a functional group number of 0.7-3.0 on average per molecule as a side chain, provided that 1 mole of glycidyl group is considered to be 1 mol of hydroxyl group in the calculation of hydroxyl value.

II. A pigment dispersing agent consisting of a product obtained by reacting the following component $A_2$ and component B with one of the following six components C at a mol ratio of component $A_2$ to component B to component C of 1:1:1-1:40:40.

Component $A_2$: an amine compound containing one or more amino group or two or more imino group or one or more amino and imino groups in its molecule and having a weight average molecular weight of 60-30,000 and an amine value of 50-2,000 mg KOH/g;

Component B: an acrylic copolymer having a weight average molecular weight of 2,000-100,000 and a hydroxyl value of 5-200 and containing one of glycidyl group

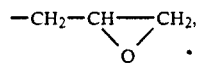

component $B_1$), acetoacetoxy group

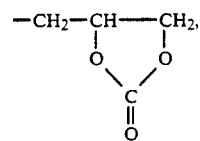

component $B_3$), in a functional group number of 0.7-3.0 on average per molecule as a side chain, provided that 1 mole of glycidyl group is considered to be 1 mol of hydroxyl group in the calculation of hydroxyl value;

Component C: a polyester resin of the following structures having a weight average molecular weight of 1,000-30,000 and containing isocyanate group or acetoacetoxy group in its terminal

 (C₁)

 (C₂)

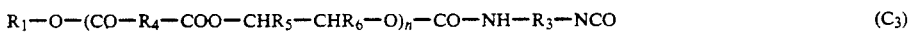 (C₃)

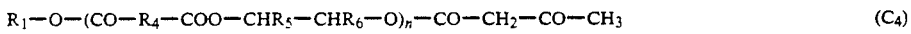 (C₄)

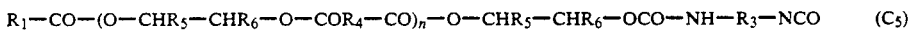 (C₅)

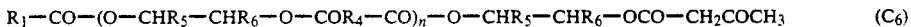 (C₆)

$R_1$: aliphatic, alicyclic or aromatic hydrocarbon group having a carbon number of 1-18, $R_2$: alkylene group having a carbon number of 1-7, $R_3$: residual group of aliphatic, alicyclic or aromatic diisocyanate having a carbon number of 6-20, $R_4$: Residual group of aliphatic, alicyclic or aromatic acid anhydride having a carbon number of 2-20, $R_5$, $R_6$: hydrogen atom, aliphatic, alicyclic or aromatic hydrocarbon group having a carbon number of 1-20, —$CH_2$—O—$R_1$ group or —$CH_2$—OCO—$R_1$ group n : an integer of 1 or more.

Moreover, when it is not required to divide components A, B and C into components $A_1$ and $A_2$, components $B_1$-$B_3$ and components $C_1$-$C_6$ in the following explanation, these components are abbreviated as components A, B and C.

In the first invention, the amine compound of the component A is strongly adsorbed on the surface of the pigment, and the acrylic resin of the component B is excellent in the compatibility with the acrylic resin as a vehicle and forms a stable and sterically repulsive layer to prevent the agglomeration of the pigment particles. Furthermore, since the acrylic resin of the component B has a hydroxyl group in its side chain, it is chemically fixed in the paint film at the curing step of the paint film.

In the second invention, the polyester resin of the component C is further incorporated in addition to the components $A_2$ and B, so that the compatibility with the polyester series resin is ensured besides the merits of the first invention, and the resulting pigment dispersing agent acts to both acrylic and polyester resin paints.

DESCRIPTION OF THE PREFERRED EMBODIMENTS

The pigment dispersing agents according to the invention will be described in detail below.

The component $A_1$ used in the first invention is an amine compound containing one or more amino group and/or imino group in the molecule for providing a bonding point to the component B and having a weight average molecular weight of 60-30,000 and an amine value of 50-2,000 mg KOH/g. The component $A_1$ may include a tertiary amine group. The component $A_2$ used in the second invention is an amine compound containing one or more amino group or two or more imino group or one or more amino and imino groups for providing bonding points to both components B and C and having a weight average molecular weight of 60-30,000 and an amine value of 50-2,000 mg KOH/g. The component $A_2$ may include a tertiary amine group.

When the weight average molecular weight of the component A is less than 60, the adsorption force to the pigment is weak and the pigment dispersing performances are degraded, while when it exceeds 30,000, the compatibility with the resin becomes poor and further the adsorption group becomes too long and hence the component A may act as an agglomerating agent to degrade the pigment dispersing performances. When the amine value of the component A is less than 50 mg KOH/g, the adsorbing force is insufficient and the dispersibility is poor, while when it exceeds 2,000 mg KOH/g, the water resistance and weather resistance of the paint film are injured.

The amine compound as the component A has any molecular structure such as straight chain, branched chain, ring and the like. For example, as the component $A_1$, mention may be made of alkylamines represented by $NH_2(CH_2)_nCH_3$ provided that $n \geq 1$ such as ethylamine, propylamine, butylamine, pentylamine, hexylamine, heptylamine, octylamine, nonylamine, decylamine and the like; and alkylimines being isomers of the above alkylamines and containing imino group. As the components $A_1$, $A_2$, mention may be made of diamines represented by $NH_2(CH_2)_nNH_2$ provided that $n \geq 2$ such as ethylenediamine, propylenediamine, tetramethylene diamine, pentamethylene diamine, hexamethylene diamine, heptamethylene diamine, octamethylene diamine and the like; alkyl polyamines such as 1,2,3-triamino propane, tris (2-aminoethyl) amine, tetra (aminomethyl) methane, iminobispropyl amine, methyliminobispropyl amine, N-methylethylene diamine, N-ethylethylene diamine and the like; polyethylene imines represented by $NH_2(CH_2CH_2NH)_nCH_2CH_2NH_2$ provided that $n \geq 1$ such as diethylene triamine, triethylene tetramine, tetraethylene pentamine, pentaethylene hexamine, hexaethylene heptamine, heptaethylene octamine, octaethylene nonamine, nonaethylene decamine and trade names of Montrec (made by Dow Chemical Co.), Polymine Waterflow (made by BASF AG) and Epomine (made by Nippon Shokubai Kagaku Kogyo K.K.); polyalkyl polyamines obtained by dehydrochlorination reaction of dihalides of chain or ring hydrocarbons having a carbon number of 1-8 with ammonia or organic amines containing chain or ring hydrocarbon group having a carbon number of 1-8; cyclodialkylene diimines such as 1,4-diazacyclo heptane, cyclo di(trimethylene) diimine, cyclo di(heptamethylene) diimine, cyclo di(octamethylene) diimine and the like; aromatic amines such as m-xylenediamine, m-toluylene diamine, dianisidine, p-phenylene diamine, 3,5-dichloro-4,4-diamino diphenylmethane and the like; heterocyclic amines such as N-aminopropyl morpholine, 1-(2-aminoethyl) piperazine, 4-amino-2-methoxy-pyrimidine, 4-(aminoethyl) pyridine, 2-amino-6-methoxy benzothiazole, N,N-diallyl melamine, benzoguanamine, acetoguanamine, 3-amino-1,2,4-triazole, 1-aminoethyl piperazine, melamine and the like; and dimethyl aminopropyl amine, diethyl aminopropyl amine, morpholine, 1-(2-hydroxyethyl) piperamine, 1-(3-aminopropyl) imidazole, 1,2-(hydroxyethyl) imidazole and the like.

The component B used in the invention is an acrylic copolymer having a weight average molecular weight of 2,000-100,000 and a hydroxyl value of 5-200 and containing one of glycidyl group, acetoacetoxy group and cyclocarbonate group as a side chain at a functional group number of 0.7-3.0 per molecule. When the weight average molecular weight is less than 2,000, the sufficient, sterically repulsive layer is not formed and the pigment dispersing performances are degraded, while when it exceeds 100,000, the pigment dispersing agent is apt to be desorbed from the surface of the pigment and the pigment dispersing performances are degraded. When the hydroxyl value is less than 5, the amount acting as a crosslinking point for the crosslinking agent is insufficient and the pigment dispersing agent derived from the component B is not fixed in the paint film, and consequently the pigment dispersing agent acts as a plasticizer in the paint film, which injuries the film performances such as humidity resistance, water resistance, weather resistance and the like and bleeds out from the surface of the paint film to badly affect the gloss, hardness and adhesion property. Furthermore, the compatibility with the binder resin having a high polarity reduces, so that the pigment dispersing performances are degraded in these systems. On the other hand, when the hydroxyl value of the component B exceeds 200, the polarity becomes excessively high and the water resistance and flexiblity of the paint film are injured, and also the compatibility with the binder resin having a low polarity reduces, so that the application thereof is restricted.

Moreover, in the component B having the glycidyl group, 1 mol of hydroxyl group is produced from 1 mol of glycidyl group through the reaction with the component A, so that it is considered that 1 mol of glycidyl group corresponds to 1 mol of hydroxyl group in the calculation of the hydroxyl value.

The component B contains one of glycidyl group, acetoacetoxy group and cyclocarbonate group as a reaction point to the component A at a functional group number of 0.7-3.0 per molecule, preferably 1.0-2.0 per molecule. The term "molecule" used herein means a molecule having a weight average molecular weight by a gel permeation chromatography based on polystyrene standard. When the functional group number of one of glycidyl group, acetoacetoxy group and cyclocarbonate group is less than 0.7 per molecule, a portion of the component B not reacting with the component A becomes large and the pigment dispersing performances are degraded, while when it exceeds 3.0, there is a possibility of promoting the three-dimensional network structure through the reaction with the component A and hence the increase of viscosity or gellation is undesirably caused.

Moreover, as an example, when the amount of the desirable functional group is expressed by the term of equivalent value (epoxy equivalent), it corresponds substantially to a range of 1,000-200,000. Even in the case of the functional group other than glycidyl group, if the desirable amount is expressed by the equivalent value, it is within the above range.

The component B contains one of glycidyl group, acetoacetoxy group and cyclocarbonate group in its side chain portion for the skeleton of acrylic resin. Each of these functional groups in the component B reacts with the amino or imino group in the component A according to the following reaction formula to form the pigment dispersing agent according to the invention.

(1) Reaction of glycidyl group

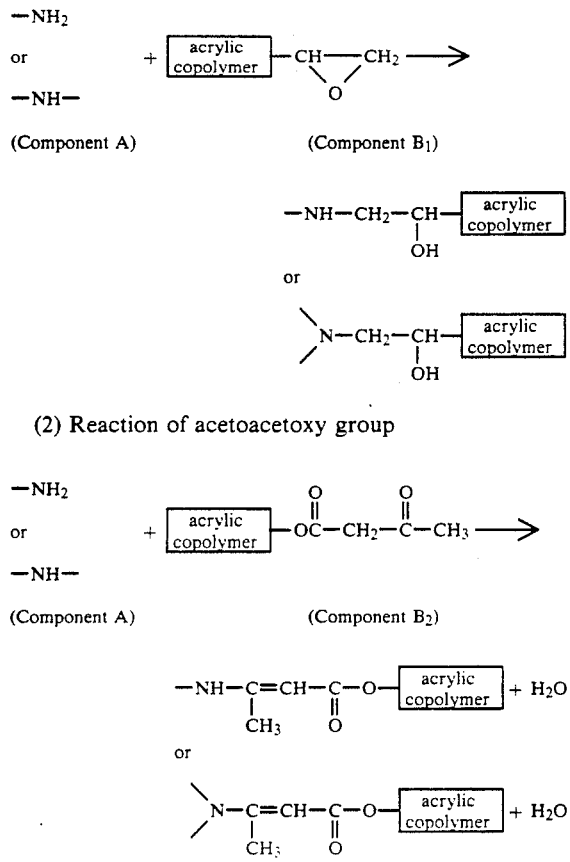

(2) Reaction of acetoacetoxy group (3) Reaction of cyclocarbonate group

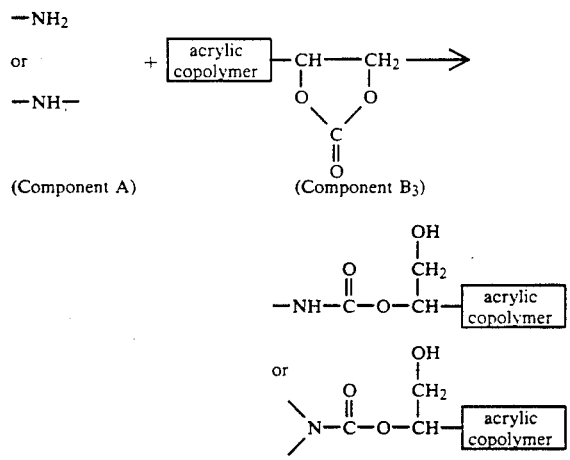

The introduction of these functional groups into the component B will be described in detail below. For example, there are two methods, one of which methods being a method of copolymerizing a monomer previously having the functional group with the other copolymerizable monomer and the other of which methods being a method of previously forming a copolymer having no functional group and then introducing the functional group thereinto. In the former method, use may be made of the following monomers.

The monomer containing glycidyl group includes, for example, glycidyl (metha)acrylate, allylglycidyl ether and the like. The monomer containing acetoacetoxy group includes, for example, acetoacetoxyethyl (metha)acrylate, acetoacetoxypropyl (metha)acrylate, allylacetoacetate and the like. The monomer containing cyclocarbonate group includes, for example, 4-(metha)acryloyloxymethyl-1,3-dioxolane-2-on, 4-(metha)acryloyloxyethyl-1,3-dioxolane-2-on, 4-(metha)acryloyloxypropyl-1,3-dioxolane-2-on, 4-(metha)acryloyloxybutyl-1,3-dioxolane-2-on and the like.

As the monomer ingredient usually constituting the acrylic copolymer of the component B, there are mentioned various $\alpha, \beta$- ethylenically unsaturated monomers always used in the art. For example, mention may be made of alkyl esters of (metha)acrylic acid such as methyl (metha)acrylate, ethyl (metha)acrylate, propyl (metha)acrylate, butyl (metha)acrylate, octyl (metha)acrylate, lauryl (metha)acrylate, stearyl (metha)acrylate, cyclohexyl (metha)acrylate, phenyl (metha)acrylate, benzyl (metha)acrylate and the like; alkoxyalkyl esters such as methoxyethyl (metha)acrylate, methoxybutyl (metha)acrylate, ethoxyethyl (metha)acrylate, ethoxybutyl (metha)acrylate and the like; hydroxyalkyl esters such as 2-hydroxyethyl (metha)acrylate, 2-hydroxypropyl (metha)acrylate and the like; lactone-modified (metha)acrylates such as Placcel FA-1, FA-2, FM-1, FM-2 and the like (trade name, made by Daicel Chemical Industries Ltd.); di or monoalkyl esters of dibasic acids such as maleic acid, fumaric acid and the like; acrylic acid, methacrylic acid, (metha)acrylonitrile, (metha)acrylamide, N-methylol (metha)acrylamide, N-methoxymethyl (metha)acrylamide, dimethylaminoethyl (metha)acrylate, diethylaminoethyl (metha)acrylate, dimethylaminopropyl (metha)acrylate, styrene, α-methyl styrene, vinyltoluene, vinyl acetate, vinyl chloride, various vinyl ethers, vinyl esters, allyl ethers, allyl esters and so on.

The component C used in the second invention is a polyester resin having a weight average molecular weight of 1,000–30,000 and containing isocyanate group or acetoacetoxy group in its terminal and has anyone of the following $C_1$–$C_6$ structures.

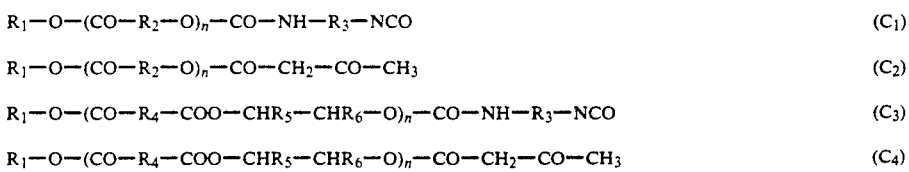

-continued

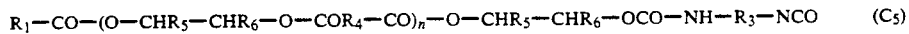

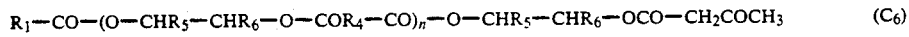

$R_1$: aliphatic, alicyclic or aromatic hydrocarbon group having a carbon number of 1-18,
$R_2$: alkylene group having a carbon number of 1-7,
$R_3$: residual group of aliphatic, alicyclic or aromatic diisocyanate having a carbon number of 6-20,
$R_4$: Residual group of aliphatic, alicyclic or aromatic acid anhydride having a carbon number of 2-20,
$R_5$, $R_6$: hydrogen atom, aliphatic, alicyclic or aromatic hydrocarbon group having a carbon number of 1-20, $-CH_2-O-R_1$ group or $-CH_2-OCO-R_1$ group
n : an integer of 1 or more.

The component C is an ingredient necessary when the pigment dispersing agent according to the invention is applied to not only the acrylic resin paints but also the polyester resin paints. The polyester structure in the component C has a compatibility with the polyester resin and exhibits excellent pigment dispersing performances.

When the weight average molecular weight of the component C is less than 1,000, it is difficult to form the sufficient, sterically repulsive layer and the sufficient compatibility with polyester resin in the paint can not be ensured, and consequently good pigment dispersing performances can not be obtained in the polyester resin paints. While, when the molecular weight of the component C exceeds 30,000, it is difficult to produce the component C with a good reproducibility, resulting in the unsuitable use as an industrial material.

The production of the component C will be described in detail below. It is obtained by ring-opening polymerization of lactones with monovalent alcohol as a reaction initiator (corresponding to components $C_1$ and $C_2$), or by successively ring-opening reaction between acid anhydride and epoxy compound with monovalent alcohol or monovalent carboxylic acid as a reaction initiator to obtain an Oligomer containing a hydroxyl group in its terminal and then reacting such a hydroxyl group with diisocyanate compound, diketene or acetoacetic acid ester (corresponding to components $C_3$, $C_4$, $C_5$ and $C_6$).

$R_1$ in the components $C_1$, $C_2$, $C_3$ and $C_4$ is an aliphatic, alicyclic or aromatic hydrocarbon group having a carbon number of 1-18.

As a feed material for $R_1$, mention may be made of monovalent alcohols represented by $R_1OH$ such as methanol, ethanol, propanol, butanol, pentanol, hexanol, heptanol, octanol, nonanol, decanol, lauryl alcohol, cetyl alcohol, oleyl alcohol, stearyl alcohol and various synthetic alcohols; alicyclic monovalent alcohols such as cyclopentanol, cyclohexanol and alkyl substituted compounds thereof; phenol, benzyl alcohol, alkyl substituted compounds thereor and the like. Similarly, various glycol ethers, glycol esters and so on may be used.

$R_2$ in the components $C_1$ and $C_2$ is an alkylene group having a carbon number of 1-7. As a feed material for $R_2$, mention may be made of lactones such as $\epsilon$-caprolactone, propiolactone, valerolactone and so on.

$R_1$ in the components $C_5$ and $C_6$ is the same as in the above $R_1$. In this case, monovalent carboxylic acids represented by $R_1COOH$ and obtained by substituting OH group of the monoalcohol $R_1OH$ in the above components $C_1$-$C_4$ are mentioned, for example, as a feed material for this $R_1$.

$R_4$ in the components $C_3$, $C_4$, $C_5$ and $C_6$ is a residual group of aliphatic, alicyclic or aromatic acid anhydride having a carbon number of 2-20. As a feed material for $R_4$, mention may be made of acid anhydrides represented by

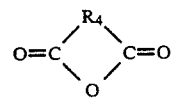

such as maleic anhydride, succinic anhydride, phthalic anhydride, tetrahydrophthalic anhydride, hexahydrophthalic anhydride, tetrahalophthalic anhydride, hexahalophthalic anhydride, hymic anhydride, hetic anhydride, various alkyl or alkenylsuccinic anhydrides and the like.

$R_5$ and $R_6$ in the components $C_3$, $C_4$, $C_5$ and $C_6$ are a hydrogen atom or an alkyl group having a carbon number of 1-20 or $-CH_2-O-R_1$ or $$-CH_2-O-\underset{\underset{O}{\|}}{C}-R_1$$

group. As a feed material for $CHR_5-CHR_6$, mention may be made of epoxy compounds represented by

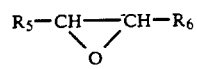

such as olefin oxides having a carbon number of 2-20, styrene oxide, alkylglycidyl ethers or glycidyl esters having a carbon number of 1-20, phenylglycidyl ether, alkylsubstituted phenylglycidyl ether and the like.

$R_3$ in the components $C_1$, $C_3$ and $C_5$ is a residual group of aliphatic, alicyclic or arematic diisocyanate having a carbon number of 6-20. As a feed material for $R_3$, mention may be made of diisocyanate compounds represented by OCN-R-NCO such as tolylene diisocyanate, isophorone diisocyanate, 4,4'-diphenylmethane diisocyanate, hexamethylene diisocyanate, lysine diisocyanate, methylcyclohexane-2,4 (2,6) diisocyanate, 4,4'-methylenebis (cyclohexylisocyanate), 1,3-(isocyanatemethyl) cyclohexane, trimethylhexamethylene diisocyanate, dimer acid diisocyanate and the like.

The pigment dispersing agent according to the first invention is comprised of the component $A_1$ and the component B and is obtained by reacting the component $A_1$ with the component B at a mol ratio of $A_1$ to B of 1:1-1:40. When the mol ratio is less than 1:1, the sterically repulsive layer is not formed sufficiently and the pigment dispersing performances are degraded, while when it exceeds 1:40, the desorption from the pigment surface is apt to be caused and the dispersibility is degraded.

The pigment dispersing agent according to the second invention is comprised of the component $A_2$, the component B and the component C and is obtained by reacting the component $A_2$ with the components B and C at a mol ratio of $A_2$:B:C of 1:1:1–1:40:40. When the mol ratio of $A_2$:B:C is less than 1:1:1, the sterically repulsive layer is not formed sufficiently and the good compatibility with various resins is not obtained, while when it exceeds 1:40:40, the desorption of the dispersing agent from the pigment surface is undesirably caused. In such a three component system, the components $A_2$ and B are combined with one of components $C_1$–$C_6$ as the component C, but two or more components C may be applied without giving any further merit.

That is, the pigment dispersing agent according to the invention is a combination of the above-mentioned components and is desirable to have an amine value of 10–500 mg KOH/g as the agent itself. When the amine value is less than 10 mg KOH/g, the adsorbing force to the pigment is lacking, while when it exceeds 500 mg KOH/g, the ratio of the sterically repulsive group to the adsorbing group is very small and the sufficient pigment dispersing performances may not be obtained.

Moreover, the measurement of amine value is carried out by using a solution of p-toluene sulfonic acid in acetic acid as a titrating agent in a solvent of acetic acid and calculating from an amount of p-toluene sulfonic acid required for neutralization through nonaqueous potentiometric titration.

The production of the pigment dispersing agent according to the invention will be described below.

(1) Production of component B

The acrylic copolymer of the component B is produced by copolymerizing two or more $\alpha$, $\beta$-ethylenically unsaturated monomers constituting the component B as previously mentioned in the presence of a polymerization initiator. As the copolymerization method, well-known methods such as solution polymerization, block polymerization, suspension polymerization and the like may be applied. Among them, solution polymerization method is preferable.

As the polymerization initiator, use may be made of any substances usually used in the vinyl-type polymerization, which includes, for example, azobisisobutyronitrile, di-t-butyl peroxide, benzoylperoxide, t-butyl peroxybenzoate, t-butyl peroctoate, cumene hydroperoxide, lauroyl peroxide, acetyl peroxide, methylethyl ketone peroxide, dicumyl peroxide and the like.

The organic solvent used in the solution polymerization is not particularly critical. As the solvent, there may be used one or more of aromatic hydrocarbons such as toluene, xylene, ethylbenzene, Solveso #100 and Solveso #150 (registered trade mark, made by Exxon Chemical Co.), turpentine oil, tetraline and the like; aliphatic hydrocarbons such as n-hexane, cyclohexane, methyl cyclohexane, n-heptane, n-octane, n-decane, mineral spirit, isooctane, nonane, trimethylhexane, solvent naphtha, Isopar (registered trade mark, made by Exxon Chemical Co.), Newsol Delax (registered trade mark, made by Nippon Oil Co., Ltd.) and the like; esters such as methyl acetate, ethyl acetate, n-butyl acetate, isobutyl acetate and the like; ethers such as ethyl ether, tetrahydrofuran, dioxane, diglyme and the like; ketones such as acetone, methyl ethyl ketone, methyl isobutyl ketone, methyl amyl ketone, cyclohexanone, isophorone and the like; alcohols such as methyl alcohol, ethyl alcohol, isopropyl alcohol, n-butyl alcohol, isobutyl alcohol, methylisobutyl carbinol, cyclohexanol, benzyl alcohol and the like; cellosolves and esters thereof such as ethylene glycol monomethyl ether, ethylene glycol monoethyl ether, ethylene glycol monobutyl ether, propylene glycol monomethyl ether, propylene glycol monoethyl ether, propylene glycol monobutyl ether and so on; chlorinated hydrocarbons such as methylene chloride, trichloroethylene, perchloroethylene, o-dichlorobenzene and the like; dimethylformamide, dimethylsulfoxide and so on.

(1)-a: Production of glycidyl group-containing acrylic copolymer

The glycidyl group-containing monomer such as glycidyl (metha)acrylate, allylglycidyl ether or the like is copolymerized with the aforementioned usual $\alpha$, $\beta$-ethylenically unsaturated monomer.

(1)-b: Production of acetoacetoxy group-containing acrylic copolymer

The acetoacetoxy group-containing acrylic copolymers are produced by anyone of the following three methods.

In a first method, a monomer containing an acetoacetic acid ester group such as acetoacetoxyethyl (metha)acrylate, acetoacetoxypropyl (metha)acrylate or the like is copolymerized with the above usual $\alpha,\beta$-ethylenically unsaturated monomer.

In a second method, a hydroxyalkyl ester of (metha)acrylic acid such as 2-hydroxyethyl (metha)acrylate, 2-hydroxypropyl (metha)acrylate or the like is copolymerized with the above usual $\alpha$, $\beta$-ethylenically unsaturated monomer to obtain an acrylic copolymer containing hydroxyl group. Then, the reaction product is held at a temperature of 0°–150° C. and reacted with diketene for 1–8 hours to acetoacetylate a required amount of the hydroxyl group. In this case, a catalyst is not necessarily used. If necessary, a slight amount of a tertiary amine such as triethylamine or the like, or a carboxylate such as potassium acetate or the like, or an organic metal compound such as dibutyl tin dilaurate or the like is used as a catalyst.

In a third method, the same acrylic copolymer containing hydroxyl group as in the second method is added with an alkyl acetoacetate such as methyl acetoacetate, ethyl acetoacetate, propyl acetoacetate, butyl acetoacetate, hexyl acetoacetate or the like, which is subjected to a reaction for the removal of alcohol at 100°–200° C. for 1–8 hours, if necessary, in the presence of an ester exchange catalyst such as calcium acetate, lead oxide or the like.

(1)-c: Production of cyclocarbonate group-containing acrylic copolymer

The cyclocarbonate group-containing acrylic copolymers are produced by either of the following two methods. In a first method, $\alpha$, $\beta$-ethylenically unsaturated monomer containing cyclocarbonate group such as 4-(metha)acryloyloxymethyl-1,3-dioxolane-2-on, 4-(metha)acryloyloxyethyl-1,3-dioxolane-2-on, 4-(metha)acryloyloxypropyl-1,3-dioxolane-2-on, 4-(metha)acryloyloxybutyl-1,3-dioxolane-2-on or the like is copolymerized with the aforementioned usual $\alpha$, $\beta$-ethylenically unsaturated monomer. Moreover, the cyclocarbonate group-containing monomer can easily be obtained reacting $\alpha$, $\beta$-ethylenically unsaturated monomer containing oxylane group (epoxy group) such as 2-(metha)acryloyloxymethyl oxylane, 2-(metha)acryloyloxyethyl oxylane, 2-(metha)acryloyloxypropyl oxylane, 2(metha)acryloyloxybutyl oxylane or the like with carbon dioxide gas in the presence of potassium iodide or sodium iodide and triphenylphosphine or quaternary ammonium salt as a catalyst at 40°-180° C. as described in DE-OS 3 529 263.

In a second method, the aforementioned oxylane group-containing monomer is previously copolymerized with the usual α, β-ethylenically unsaturated monomer and thereafter reacted with carbon dioxide gas as in the first method to convert the oxylane group into cyclocarbonate group.

(2) Production of component C (2)-a: Production of components $C_1$ and $C_2$

An alcohol of $R_1OH$ and a lactone of

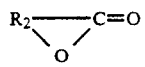

are reacted in the presence of a tertiary amine such as triethylamine or the like, or an organic metal compound such as tetrabutoxy titanate or the like, or a phosphorus compound such as triphenylphosphine or the like as a catalyst at 100°-200° C. for 1-10 hours to obtain a polyester oligomer containing hydroxyl group in its terminal. If the viscosity of the resulting product is high, the reaction may be carried out in the coexistence of an organic solvent having no active hydrogen, if necessary.

The component $C_1$ is produced by reacting the above polyester oligomer with a diisocyanate compound of $OCN-R_3-NCO$ in the absence or presence of an organic metal compound such as dibutyltin dilaurate, a carboxylate such as potassium benzoate or a tertiary amine such as triethylene diamine or the like as a catalyst in such a manner that a mol ratio of hydroxyl group of the above oligomer to the diisocyanate $OCN-R_3-NCO$ is within a range of 1:0.8-1:1.5, preferably 1:1. The reaction conditions are desirably 20°-80° C. and 1-10 hours.

The component $C_2$ is produced by reacting the above polyester oligomer with diketene at a mol ratio of diketene to hydroxyl group of 0.9-1.1:1, preferably 1:1 under the same reaction conditions as in the above item (1)-b. Alternatively, it may be produced by using acetoacetic acid ester instead of diketene through the reaction for the removal of alcohol. (2)-b: Production of components $C_3$, $C_4$, $C_5$ and $C_6$ The components $C_3$ and $C_4$ are produced by reacting monovalent alcohol of $R_1OH$, acid anhydride of

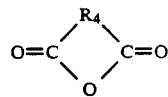

and epoxy compound of

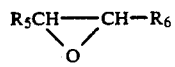

in the absence or presence of a tertiary amine such as triethylene diamine, quaternary ammonium salt such as tetramethyl ammonium chloride, organic carboxylate such as potassium benzoate or inorganic salt such as potassium iodide as a catalyst at 100°-180° C. for 1-10 hours to obtain a polyester oligomer containing hydroxyl group in its terminal through successive ring-opening of the acid anhydride and epoxy compound. On the other hand, the components $C_5$ and $C_6$ are produced by reacting carboxylic acid of $R_1COOH$ instead of $R_1OH$ with the acid anhydride and epoxy compound under the same conditions as described above to obtain a polyester oligomer containing hydroxyl group in its terminal through successive ring-opening of the epoxy compound and acid anhydride. Moreover, if the viscosity of the resulting product during these reactions is high, the reaction may be carried out in the co-existence of an organic solvent containing no active hydrogen, if necessary. In the components $C_3$ and $C_5$, the above prepolymer is reacted with diisocyanate compound in the same manner as in the component $C_1$, while in the components $C_4$ and $C_6$, the prepolymer is reacted with diketene or acetoacetic acid ester in the same manner as in the component $C_2$, whereby the objective polyester compound containing isocyanate group or acetoacetoxy group in its terminal is obtained.

(3) Production of pigment dispersing agent from components $A_1$ and B

The pigment dispersing agent according to the first invention is produced by mixing the components $A_1$ and B and then reacting them in the absence of a catalyst for about 1-10 hours. The reaction temperature is desirable to be 20°-140° C. in case of glycidyl group as a reaction point of the component B, 20°-100° C. in case of acetoacetoxy group and 20°-120° C. in case of cyclocarbonate group. If it is required to use a synthetic solvent, anyone of the solvents described in the production of the component B is used.

(4) Production of pigment dispersing agent from components $A_2$, B and C

The pigment dispersing agent according to the second invention is produced by mixing the components $A_2$, B and C and then reacting them in the absence of a catalyst at 20°-100° C. for 1-10 hours. Alternatively, there are a method wherein the component $A_2$ is reacted with the component B and then the component C is added thereto, and a method wherein the component $A_2$ is reacted with the component C and then the component B is added thereto. When the component $A_2$ is first reacted with the component B, the reaction condition is the same as in the above item (3), and the second reaction stage may only be carried out at 20°-100° C. When the component $A_2$ is first reacted with the component C, it is desirable that the reaction is carried out 20°-100° C. at each stage.

The pigment dispersing agents according to the invention are used for paints, inks, toners and magnetic tape coating materials as well as various colorants. As an objective pigment, mention may be made of inorganic pigments such as titanium dioxide, zinc oxide, cadmium sulfide, iron oxide, calcium carbonate, red lead, zinc sulfide, barium sulfate, barium carbonate, clay, talc, chrome yellow, carbon black and so on; organic pigments such as azo series, diazo series, condensed diazo series, thioindigo series, indanthrone series, anthraquinone series, benzimidazolone series, phthalocyanine series, pyranthrone series, anthrapyridine series, isoindolinone series, perylene series, quinacridone series, furavanthrone series, dioxazine series, piranthrone series, perinone series and the like. The pigment dispersing agents according to the invention exhibit an effect of enhancing the pigment dispersibility against these pigments.

The pigment dispersing agent according to the invention is used in an amount as a solid content of 1-200% by weight, preferably 5-100% by weight to the pigment in a so-called pigment dispersion base composition. The pigment dispersion base composition is comprised of the pigment dispersing agent according to the invention, the pigment and the organic solvent, or may further contain a part or whole of a film-forming resin. Such a pigment dispersion base is dispersed by means of a dispersing machine usually used in the art, such as roll mill, ball mill, sand grind mill, attritor, paint shaker, kneader, high speed dispersing machine, ultrasonic dispersing machine, dissolver or the like, which is supplied for use in the colorant.

The paints obtained by using the pigment dispersing agent according to the invention are excellent in the dispersibility of pigment and color strength and form a paint film having good gloss, distinctness of image and smoothness. Furthermore, the pigment dispersing agent according to the invention strongly adsorbs on the surface of the pigment to prevent a tendency of agglomerating the pigment particles, resulting in the production of paints having an excellent storage stability and a high solid content.

Moreover, the pigment dispersing agent according to the invention has a crosslinking point in the structure, so that it causes a curing reaction with a crosslinking agent, and consequently the pigment dispersing agent is chemically fixed in the paint film likewise the case of the film-forming resin to chemically strengthen the boundary face between the pigment and the resin. Therefore, there is no damage on the water resistance, humidity resistance, weather resistance and the like of the paint film. Furthermore, there is no bleeding of the dispersing agent on the surface of the paint film, so that there is no reduction of gloss, surface hardness and the like and no degradation of adhesion property between paint films. In addition, the invention solves the difficulty using the polymer type pigment dispersing agent. That is, the pigment dispersing agents according to the invention can be applied to both the acrylic resin paint and polyester resin paint greatly used in the art, and also are applicable to paint formulations containing resins of low or high polarity.

The following examples are given in illustration of the invention and are not intended as limitations thereof. In these examples, "part" and "%" are by weight.

SYNTHESIS EXAMPLES 1 AND 2

Production of polyester resin

A polyester resin as a main film-forming component for polyester resin series paint was produced as follows.

Into a reaction vessel provided with a reflux condenser, an inlet tube for nitrogen gas, a thermometer and a stirring blade were charged starting materials having a composition (Synthesis Examples 1 and 2) as shown in the following Table 1, which were heated to an upper limit temperature of 230° C. under a stream of nitrogen gas with stirring. Water generated in the progress of the reaction was removed together with xylene through azeotropic distillation and the heating was continued till the acid value was about 10 to complete the reaction. The resulting resin was diluted with xylene so as to render the nonvolatile content into 60%, whereby the objective polyester resins PE-1 and PE-2 were obtained.

TABLE 1

| Polyester resin No. | Synthesis Example 1 PE-1 | Synthesis Example 2 PE-2 |
|---|---|---|
| lauric acid | 4.5 | — |
| tall oil fatty acid | — | 16.2 |
| castor oil | — | 3.8 |
| phthalic anhydride | 5.8 | 17.7 |
| isophthalic acid | 21.8 | — |
| adipic acid | 1.6 | 5.0 |
| neopentyl glycol | 12.8 | 10.4 |
| trimethylol propane | 7.4 | — |
| pentaerythritol | — | 8.6 |
| Cardula E-10[1] | 8.3 | — |
| xylene | 1.8 | — |
| xylene (diluting solvent) | 36.0 | 38.3 |
| nonvolatile content (%) | 60 | 60 |
| resin acid value | 10 | 10 |

[1] Cardula E-10: trade name, made by Shell Chemicals Co., Ltd. (glycidylester of versatic acid)

SYNTHESIS EXAMPLES 3-11

Production of acrylic resin

An acrylic resin as a main film-forming component for acrylic resin series paints was produced as follows.

Into a reaction vessel provided with a reflux condenser, an inlet tube for nitrogen gas, a thermometer, a stirring blade and a monomer dropping device was charged a solvent shown in the following Table 2 and then the temperature was raised to a reflux temperature under a stream of nitrogen gas. A mixture of each monomer and t-butylperoxy benzoate as a polymerization initiator as shown in Table 2 was added dropwise through the dropping device over 2 hours under reflux state. After the addition, the stirring was further continued for 5 hours under reflux state to complete the polymerization, whereby the objective varnishes AC-1 - AC-9 were obtained.

SYNTHESIS EXAMPLES 12-18

A polyester resin (component C) for the pigment dispersing agent was produced as follows.

Into a reaction vessel provided with a reflux condenser, an inlet tube for nitrogen gas, a dropping funnel, a thermometer and a stirring blade were charged xylene as a solvent, tetrabutoxy titanate and 2-ethyl hexanol or decanol among ingredients shown in the following Table 3 and then the temperature was raised to 130°-140° C. under a stream of nitrogen gas. Further, ε-caprolactone shown in Table 3 was added dropwise through the dropping funnel over 2 hours under reflux state and thereafter the stirring was continued for about 5 hours.

In Synthesis Example 12, the temperature of the reaction product was lowered to 30° C. and tolylene diisocyanate was added in an amount shown in Table 3 and then the stirring was continued for about 2 hours to obtain a polyester resin $C_1$ having properties shown in Table 3 and containing isocyanate group in its terminal.

In Synthesis Examples 13-18, the temperature of the reaction product was lowered to 70° C. and triethylene diamine shown in Table 3 was added and then diketene shown in Table 3 was added dropwise over about 2 hours with strong stirring to produce polyester resins $C_{2-1}$ -$C_2$-6 containing acetoacetoxy group in their terminal.

SYNTHESIS EXAMPLES 19-22

In the same synthesis vessel as in Synthesis Example 12, toluene as a solvent, any one of lauric acid, octylic acid, decanol and cetyl alcohol, phthalic anhydride and tetramethyl ammonium chloride as shown in Table 3 were mixed and then rendered into a reflux state of about 135° C. Next, butylglycidyl ether or a mixture of butylglycidyl ether and phenylglycidyl ether in Table 3 was added dropwise through the dropping funnel over about 1 hour, which was maintained under reflux state for about 5 hours. After the completion of the reaction, xylene in Table 3 was added to conduct dilution.

In Synthesis Examples 19 and 21, the temperature of the reaction product was lowered to 30° C., and dibutyltin dilaurate and tolylene diisocyanate in Table 3 were added and then the stirring was continued for about 2 hours to complete the reaction.

In Synthesis Examples 20 and 22, the temperature of the reaction product was lowered to about 50° C., and triethylene diamine in Table 3 was added and further diketene was added dropwise through the dropping funnel over about 30 minutes with strong stirring and the stirring was further continued for 4 hours to produce polyester resins.

SYNTHESIS EXAMPLES 23-72

A mixture of monomers as shown in the following Table 4 was added dropwise through the dropping funnel in the same vessel according to the same method as described in Synthesis Examples 3-11 over about 2 hours. After the addition, the stirring was further continued for 2 hours to obtain acrylic resins ($B_1$-1-$B_1$-10, $B_2$-1 –$B_2$-25, $B_3$-1-$B_3$-15) as a component B for pigment dispersing agent.

Moreover, in Synthesis Examples 51 and 52, the reaction mixture after the completion of the above reaction was cooled to about 50° C., and triethylene diamine in Table 4 was added and then diketene in Table 4 was added dropwise over about 30 minutes with strong stirring and the stirring was further continued for about 4 hours to complete the production.

EXAMPLE 1-26

Pigment dispersing agents of $A_1$-B type were produced according to a composition ratio as shown in the following Table 5 as follows.

Into the same vessel as in Synthesis Example 1 was charged a component B or a mixture of component B and solvent as shown in Table 5, and then a component $A_1$ was added with strong stirring, which were heated to a temperature shown in the column for reaction conditions of Table 5 and reacted at this temperature for a time shown in the column for reaction conditions of Table 5 to produce the objective pigment dispersing agents.

Moreover, the combination of components $A_1$ and B is represented, for example, as $A_1$-$B_1$ in the column for structure of pigment dispersing agent of Table 5, wherein $B_1$ is component B containing gylcidyl group, $B_2$ is component B containing acetoacetoxy group and $B_3$ is component B containing cyclocarbonate group.

EXAMPLES 27-53

Pigment dispersing agents of $A_2$-B-C type were produced according to a composition ratio as shown in the following Table 6 as follows.

Into the same vessel as in Synthesis Example 1 was charged a mixture of component B and solvent as shown in Table 6, and then a component $A_2$ was added at room temperature with strong stirring, which were heated and reacted under synthesis conditions shown in the column for reaction conditions in $A_2$-B reaction of Table 6 likewise Examples 1-26. Then, the temperature of the reaction product was adjusted to a temperature shown in the column of $A_2$-C reaction conditions and a component C was added dropwise over about 30 minutes and stirred for a time described in the same column to produce the objective pigment dispersing agents.

Moreover, the combination of components $A_2$, B and C is represented, for example, as $A_2$-$B_1$-$C_1$ in the column for structure of pigment dispersing agent of Table 6, wherein $B_1$-$B_3$ and $C_1$-$C_6$ are the same components as previously mentioned.

APPLICATION EXAMPLES 1-64

Dispersion pastes and paints each having a composition as shown in the following Table 7 were prepared by using the pigment dispersing agents shown in Tables 5 and 6, and then the properties of the paste and film performances of the paint were measured to evaluate the effect of the pigment dispersing agent according to the invention.

That is, starting materials were uniformly mixed in accordance with a formulation of dispersion paste shown in Table 7, and then the mixture was dispersed by means of a paint shaker (made by Red Devil Co.) to obtain a dispersion paste. The viscosity and storage stability of this dispersion paste are shown in the column of paste properties of Table 7.

Then starting materials using the above dispersion paste were mixed in accordance with a formulation for paint shown in Table 7 and thoroughly stirred to prepare a paint. To this paint was added a thinner for dilution (cellosolve acetate/ xylene=50/50 mixed solvent) so as to adjust a viscosity to 20 seconds (25° C.) through Ford Cup No. 4, whereby a finishing paint for spray coating was obtained.

Next, a primer coated plate was provided in order to evaluate the film performances of this paint. That is, an SPCC dull steel sheet (size: 0.8×100×150 mm) subjected to a zinc phosphate treatment was subjected to an electrodeposition with a general-purpose black cation electropaint (Aqua No. 4200, trade name, made by Nippon Oil and Fats Co., Ltd.) and then baked at 170° C. for 30 minutes to obtain a dried paint film of 20 μm in thickness. Thereafter, an alkyd/melamine series gray intermediate paint for automotive (Epico No. 1500 sealer, trade name, made by Nippon Oil and Fats Co., Ltd.) was diluted with a thinner (Thinner TR 101, trade name, made by Nippon Oil and Fats Co., Ltd.) so as to adjust a viscosity to 30 seconds (25° C.) through Ford Cup No. 4 and then sprayed onto the above primer coated sheet and baked at 140° C. for 30 minutes to obtain a dried paint film of 40 μm in thickness. Then, the aforementioned finishing paint was sprayed onto the thus painted steel sheet and baked at 140° C. for 30 minutes to obtain a test film (finished film thickness: 40 μm). The specular gloss at 30° (Drigon goniophotometer, made by Hunter Laboratories), humidity resistance, weather resistance and presence or absence of bleeding phenomenon of dispersing agent onto film surface were evaluated with respect to the thus obtained test specimen. The result are also shown in Table 7.

As seen from Table 7, all of the dispersion pastes using the pigment dispersing agent according to the invention are excellent in the storage stability. As to the film performances, it has been confirmed that the gloss is excellent in all paint films and the humidity resistance and weather resistance are not damaged. Furthermore, there is observed no bleeding of the pigment dispersing agent on the film surface.

COMPARATIVE EXAMPLES 1–13

Pigment dispersing agents of Comparative Examples 1–13 were produced in accordance with a composition ratio as shown in the following Table 8 in A-B system in the same manner as in Examples 1–26 and in A-B-C system in the same manner as in Examples 27–53.

APPLICATION COMPARATIVE EXAMPLES 1–16

Dispersion pastes and paints as shown in the following Table 9 were produced by using the pigment dispersing agents of Comparative Examples 1–13 and the pigment dispersing agents of Examples 2 and 22. Either of storage stability of dispersion paste and film performances of paint as shown in Table 9 is poorer than that shown in Table 7.

TABLE 2

| | | Synthesis Example | | | | |
|---|---|---|---|---|---|---|
| | | 3 | 4 | 5 | 6 | 7 |
| | | \multicolumn{5}{c}{Acrylic resin No.} | | | | |
| | | AC-1 | AC-2 | AC-3 | AC-4 | AC-5 |
| Solvent | xylene | 40 | 40 | 40 | 10 | 20 |
| | isobutyl acetate | — | — | — | 30 | 20 |
| Monomer composition | methyl methacrylate | 23.4 | 15.0 | 30.5 | 32.0 | 28.0 |
| | ethyl acrylate | — | 22.0 | — | — | — |
| | butyl acrylate | 13.3 | — | 20.0 | — | 5.0 |
| | butyl methacrylate | — | — | — | 5.0 | 5.0 |
| | hexyl methacrylate | 10.0 | — | — | — | — |
| | lauryl methacrylate | — | 10.0 | — | — | 12.0 |
| | styrene | — | 5.0 | — | 13.0 | 4.0 |
| | 2-hydroxyethyl acrylate | — | 7.0 | — | 8.0 | 5.0 |
| | 2-hydroxyethyl methacrylate | 12.0 | — | 8.0 | — | — |
| | acrylic acid | 0.7 | 0.5 | 1.0 | — | — |
| | t-butyl peroxy benzoate | 0.6 | 0.5 | 0.5 | 2.0 | 1.0 |
| Properties | nonvolatile content (%) | 60 | 60 | 60 | 60 | 60 |
| | weight average molecular weight | 21,000 | 24,000 | 25,200 | 33,800 | 58,500 |
| | hydroxyl value | 86 | 56 | 58 | 64 | 40 |

| | | Synthesis Example | | | |
|---|---|---|---|---|---|
| | | 8 | 9 | 10 | 11 |
| | | \multicolumn{4}{c}{Acrylic resin No.} | | |
| | | AC-6 | AC-7 | AC-8 | AC-9 |
| Solvent | xylene | 25 | 20 | 52 | 39.8 |
| | isobutyl acetate | 15 | 20 | — | — |
| Monomer composition | methyl methacrylate | 2.0 | 30.0 | 16.4 | 24.7 |
| | ethyl acrylate | — | — | — | — |
| | butyl acrylate | 5.0 | 5.0 | 15.8 | — |
| | butyl methacrylate | 10.0 | 4.0 | — | 16.9 |
| | hexyl methacrylate | — | — | — | — |
| | lauryl methacrylate | 6.0 | 3.0 | — | — |
| | styrene | 30.0 | 11.0 | 5.2 | 5.0 |
| | 2-hydroxyethyl acrylate | 5.0 | 5.0 | — | — |
| | 2-hydroxyethyl methacrylate | — | — | 9.7 | 11.9 |
| | acrylic acid | — | — | 0.3 | 1.1 |
| | t-butyl peroxy benzoate | 2.0 | 2.0 | 0.6 | 0.6 |
| Properties | nonvolatile content (%) | 60 | 60 | 50 | 60 |
| | weight average molecular weight | 28,200 | 29,300 | 20,000 | 21,000 |
| | hydroxyl value | 40 | 40 | 80 | 86 |

TABLE 3

| | | Synthesis Example | | | | | |
|---|---|---|---|---|---|---|---|
| | | 12 | 13 | 14 | 15 | 16 | 17 |
| | | \multicolumn{6}{c}{Polyester resin No.} | | | | | |
| | | $C_1$ | $C_2$-1 | $C_2$-2 | $C_2$-3 | $C_2$-4 | $C_2$-5 |
| Solvent | xylene | 40 | 40 | 40 | 40 | 40 | 40 |
| | toluene | — | — | — | — | — | — |
| Monomer composition | ε-caprolactone | 55.08 | 58.44 | 49.17 | 53.47 | 57.11 | 58.81 |
| | lauric acid | — | — | — | — | — | — |
| | octylic acid | — | — | — | — | — | — |
| | phthalic anhydride | — | — | — | — | — | — |
| | 2-ethyl hexanol | 2.1 | 0.92 | 6.5 | — | — | — |
| | decanol | — | — | — | 4.21 | 1.85 | 0.7 |
| | cetyl alcohol | — | — | — | — | — | — |
| | butyl glycidyl ether | — | — | — | — | — | — |
| | phenyl glycidyl ether | — | — | — | — | — | — |
| | tetrabutoxy titanate | 0.02 | 0.02 | 0.02 | 0.02 | 0.02 | 0.02 |
| | tetramethyl ammonium chloride | — | — | — | — | — | — |
| | triethylene diamine | — | 0.01 | 0.01 | 0.01 | 0.01 | 0.01 |

TABLE 3-continued

| | | | | | | | |
|---|---|---|---|---|---|---|---|
| | dibutyltin dilaurate | — | — | — | — | — | — |
| | tolylene diisocyanate | 2.8 | — | — | — | — | — |
| | diketene | — | 0.61 | 4.3 | 2.29 | 1.01 | 0.46 |
| Properties | nonvolatile content (%) | 60 | 60 | 60 | 60 | 60 | 60 |
| | weight average molecular weight | 3,700 | 8,500 | 1,200 | 2,250 | 5,120 | 11,200 |

| | | Synthesis Example | | | | |
|---|---|---|---|---|---|---|
| | | 18 | 19 | 20 | 21 | 22 |
| | | Polyester resin No. | | | | |
| | | $C_2$-6 | $C_3$ | $C_4$ | $C_5$ | $C_6$ |
| Solvent | xylene | 40 | 25 | 25 | 25 | 25 |
| | toluene | — | 15 | 15 | 15 | 15 |
| Monomer composition | ε-caprolactone | 41.67 | — | — | — | — |
| | lauric acid | — | — | — | 2.5 | — |
| | octylic acid | — | — | — | — | 2.9 |
| | phthalic anhydride | — | 27.5 | 29.4 | 28.5 | 26.9 |
| | 2-ethyl hexanol | — | — | — | — | — |
| | decanol | 11.85 | 3.6 | — | — | — |
| | cetyl alcohol | — | — | 2.4 | — | — |
| | butyl glycidyl ether | — | 21.2 | 18.2 | 26.7 | 13.2 |
| | phenyl glycidyl ether | — | 3.5 | 9.07 | — | 15.2 |
| | tetrabutoxy titanate | 0.02 | — | — | — | — |
| | tetramethyl ammonium chloride | — | 0.06 | 0.06 | 0.06 | 0.06 |
| | triethylene diamine | 0.01 | — | 0.01 | — | 0.01 |
| | dibutyltin dilaurate | — | 0.04 | — | 0.04 | — |
| | tolylene diisocyanate | — | 4.1 | — | 2.2 | — |
| | diketene | 6.45 | — | 0.86 | — | 1.73 |
| Properties | nonvolatile content (%) | 60 | 60 | 60 | 60 | 60 |
| | weight average molecular weight | 800 | 2,580 | 6,000 | 4,670 | 2,960 |

TABLE 4(a)

| | | Synthesis Example | | | | | | | | | |
|---|---|---|---|---|---|---|---|---|---|---|---|
| | | 23 | 24 | 25 | 26 | 27 | 28 | 29 | 30 | 31 | 32 |
| | | Acrylic resin No. | | | | | | | | | |
| | | $B_1$-1 | $B_1$-2 | $B_1$-3 | $B_1$-4 | $B_1$-5 | $B_1$-6 | $B_1$-7 | $B_1$-8 | $B_1$-9 | $B_1$-10 |
| Solvent | xylene | 40 | 40 | 40 | 10.5 | 20.5 | 26.0 | 15.3 | 40 | 40 | 60 |
| | isobutyl acetate | — | — | — | 26.2 | 15.4 | 10.4 | 20.4 | — | — | — |
| | ethyl acetate | — | — | — | 5.19 | 5.23 | 5.34 | 5.08 | — | — | — |
| Monomer composition | methyl methacrylate | 30.0 | 14.15 | 33.03 | 31.4 | 25.6 | 1.8 | 30.6 | 33.23 | 31.9 | 22.61 |
| | ethyl acrylate | — | 12.0 | — | — | — | — | — | — | — | — |
| | butyl acrylate | 10.0 | — | 22.1 | — | 5.1 | 5.2 | 5.1 | 22.1 | 22.1 | 14.7 |
| | butyl methacrylate | — | — | — | 4.2 | 5.1 | 10.4 | 4.1 | — | — | — |
| | hexyl methacrylate | 10.0 | — | — | — | — | — | — | — | — | — |
| | lauryl methacrylate | — | 12 | — | — | 12.3 | 6.2 | 3.0 | — | — | — |
| | styrene | — | 9.9 | — | 12.6 | 4.1 | 31.3 | 12.2 | — | — | — |
| | 2-hydroxyethyl acrylate | — | — | — | 9.1 | 6.0 | 2.1 | 3.1 | — | — | — |
| | 2-hydroxyethyl methacrylate | 3.7 | 8.9 | 3.8 | — | — | — | — | 3.8 | 3.8 | 2.5 |
| | glycidyl acrylate | — | — | — | — | — | 0.26 | 0.20 | — | — | — |
| | glycidyl methacrylate | 2.0 | 0.85 | 0.37 | 0.18 | 0.16 | — | — | 0.17 | 1.5 | 0.06 |
| | t-butyl peroxy benzoate | 4.3 | 2.2 | 0.7 | 0.63 | 0.51 | 1.0 | 0.92 | 0.7 | 0.7 | 0.13 |
| Properties | nonvolatile content (%) | 60 | 60 | 60 | 58.1 | 58.9 | 58.3 | 59.2 | 60 | 60 | 40 |
| | hydroxyl value | 40 | 70 | 30 | 77 | 50 | 19 | 27 | 30 | 37 | 30 |
| | weight average molecular weight | 5,000 | 10,000 | 25,000 | 80,000 | 90,000 | 30,000 | 40,000 | 25,200 | 25,000 | 110,000 |
| | number of epoxy group in one molecule | 1.2 | 1.0 | 1.1 | 1.7 | 1.7 | 1.0 | 1.0 | 0.5 | 4.4 | 1.1 |
| | number of acetoacetoxy group in one molecule | — | — | — | — | — | — | — | — | — | — |
| | number of cyclocarbonate group in one molecule | — | — | — | — | — | — | — | — | — | — |

TABLE 4(b)

| | | Synthesis Example | | | | | | |
|---|---|---|---|---|---|---|---|---|
| | | 33 | 34 | 35 | 36 | 37 | 38 | 39 |
| | | Acrylic resin No. | | | | | | |
| | | $B_2$-1 | $B_2$-2 | $B_2$-3 | $B_2$-4 | $B_2$-5 | $B_2$-6 | $B_2$-7 |
| Solvent | xylene | 51.58 | 49.72 | 50.11 | 50.21 | 50.23 | 52.49 | 48.2 |
| | isobutyl acetate | — | — | — | — | — | — | — |
| | ethyl acetate | — | — | — | — | — | — | — |
| Monomer composition | methyl acrylate | — | — | 10.2 | — | — | — | — |
| | methyl methacrylate | 12.5 | 15.1 | — | 20.4 | 20.3 | 21.1 | 20.0 |
| | ethyl acrylate | — | 2.6 | — | — | — | — | — |
| | ethyl methacrylate | — | — | 10.2 | — | 9.9 | — | — |
| | propyl methacrylate | — | — | 15.7 | — | — | 12.0 | — |
| | butyl acrylate | 10.4 | 15.1 | 10.2 | 15.3 | 15.2 | 10.5 | 15.0 |
| | butyl methacrylate | 10.4 | 15.1 | — | — | — | — | — |

TABLE 4(b)-continued

|  |  |  |  |  |  |  |  |  |
|---|---|---|---|---|---|---|---|---|
|  | hexyl methacrylate | — | — | — | 9.4 | — | — | 9.1 |
|  | styrene | 8.3 | — | — | — | — | — | — |
|  | 2-hydroxyethyl methacrylate | 5.5 | 1.1 | 2.3 | 3.4 | 3.4 | 3.3 | 4.6 |
|  | acetoacetoxyethyl methacrylate | 0.62 | 0.63 | 0.63 | 0.63 | 0.51 | 0.35 | 1.1 |
|  | t-butyl peroxy benzoate | 0.7 | 0.65 | 0.66 | 0.66 | 0.46 | 0.26 | 2.0 |
| Properties | nonvolatile content (%) | 47.7 | 49.7 | 49.2 | 49.1 | 49.3 | 48.2 | 49.8 |
|  | hydroxyl value | 50 | 10 | 20 | 30 | 30 | 30 | 40 |
|  | weight average molecular weight | 19,500 | 21,050 | 19,800 | 20,100 | 24,900 | 35,700 | 9,820 |
|  | number of epoxy group in one molecule | — | — | — | — | — | — | — |
|  | number of acetoacetoxy group in one molecule | 1.2 | 1.2 | 1.2 | 1.2 | 1.2 | 1.2 | 1.0 |
|  | number of cyclocarbonate group in one molecule | — | — | — | — | — | — | — |

| | | Synthesis Example | | | | | |
|---|---|---|---|---|---|---|---|
| | | 40 | 41 | 42 | 43 | 44 | 45 |
| | | Acrylic resin No. | | | | | |
| | | B₂-8 | B₂-9 | B₂-10 | B₂-11 | B₂-12 | B₂-13 |
| Solvent | xylene | 49.62 | 48.7 | 40.5 | 45.8 | 44.6 | 44.0 |
|  | isobutyl acetate | — | — | — | — | 5 | 5 |
|  | ethyl acetate | — | — | — | — | — | — |
| Monomer composition | methyl acrylate | — | — | — | — | — | — |
|  | methyl methacrylate | 20.1 | 20.4 | 20.3 | — | 22.8 | — |
|  | ethyl acrylate | — | — | — | 21.4 | — | 18.1 |
|  | ethyl methacrylate | — | — | — | — | — | — |
|  | propyl methacrylate | — | — | — | — | — | — |
|  | butyl acrylate | 15.1 | 15.3 | 20.3 | — | 18 | — |
|  | butyl methacrylate | — | — | 11.1 | 14.1 | 3.57 | 15 |
|  | hexyl methacrylate | 9.4 | — | — | 5.0 | — | — |
|  | styrene | — | 6.8 | — | — | — | 10 |
|  | 2-hydroxyethyl methacrylate | 4.6 | 5.7 | 6.9 | 7.0 | 5.2 | 6.1 |
|  | acetoacetoxyethyl methacrylate | 0.53 | 1.1 | 0.9 | 1.6 | 0.43 | 0.6 |
|  | t-butyl peroxy benzoate | 0.65 | 2.0 | 1.2 | 4.9 | 0.4 | 0.5 |
| Properties | nonvolatile content (%) | 49.8 | 49.2 | 59.5 | 49.1 | 50 | 50 |
|  | hydroxyl value | 40 | 50 | 50 | 62 | 45 | 55 |
|  | weight average molecular weight | 19,900 | 9,800 | 14,000 | 5,300 | 26,100 | 20,500 |
|  | number of epoxy group in one molecule | — | — | — | — | — | — |
|  | number of acetoacetoxy group in one molecule | 1.0 | 1.0 | 1.0 | 0.8 | 1.0 | 1.2 |
|  | number of cyclocarbonate group in one molecule | — | — | — | — | — | — |

TABLE 4(c)

| | | Synthesis Example | | | | | | | | | | | |
|---|---|---|---|---|---|---|---|---|---|---|---|---|---|
| | | 46 | 47 | 48 | 49 | 50 | 51 | 52 | 53 | 54 | 55 | 56 | 57 |
| | | Acrylic resin No. | | | | | | | | | | | |
| | | B₂-14 | B₂-15 | B₂-16 | B₂-17 | B₂-18 | B₂-19 | B₂-20 | B₂-21 | B₂-22 | B₂-23 | B₂-24 | B₂-25 |
| Solvent | xylene | 30 | 20 | 30 | 30 | 30 | 35 | 35 | 30 | 30 | 30 | 30 | 44.0 |
|  | isobutyl acetate | — | — | — | — | — | — | — | — | — | — | — | 5 |
|  | ethyl acetate | — | — | — | — | — | — | — | — | — | — | — | — |
|  | toluene | 10 | 10 | 10 | 10 | 5 | 5 | 5 | 10 | 10 | 10 | 10 | — |
|  | Solveso #150 | — | 10 | — | — | 5 | — | — | — | — | — | — | — |
| Monomer composition | methyl methacrylate | 30 | 20 | — | 19 | 11 | — | — | — | — | — | — | 22.8 |
|  | ethyl acrylate | — | — | — | — | — | 10 | 6.67 | 19 | 20 | 12 | — | — |
|  | ethyl methacrylate | — | — | — | 10 | — | — | — | — | — | — | 24.7 | — |
|  | propyl acrylate | — | — | — | — | — | — | — | — | — | — | 10.0 | — |
|  | butyl acrylate | — | — | — | 20 | — | 20.1 | — | — | 12 | 20 | — | 18 |
|  | butyl methacrylate | 21 | 10 | — | — | 10 | 13.65 | 32 | 10 | 10 | — | 12 | 3.59 |
|  | hexyl methacrylate | — | — | — | — | — | — | — | — | — | — | 5 | — |
|  | lauryl methacrylate | — | — | 16 | — | 10 | — | — | — | — | — | — | — |
|  | styrene | — | 10 | 30 | — | 20 | — | 15 | — | 10 | 20 | 7 | 5.18 |
|  | 2-hydroxyethyl methacrylate | 7.9 | 7.4 | 7.2 | 7.0 | 7.2 | 15.3 | 3.5 | 7.5 | 7.7 | 7.2 | — | — |
|  | acetoacetoxyethyl methacrylate | 0.5 | 2.6 | 1.8 | 2.0 | 0.8 | — | — | 8.5 | 0.2 | 0.3 | 0.8 | 0.43 |
|  | t-butyl peroxy benzoate | 0.6 | 10.0 | 5.0 | 2.0 | 1.0 | 0.7 | 2.2 | 15 | 0.1 | 0.5 | 0.5 | 0.4 |
| Acetoacetylating agent | diketene | — | — | — | — | — | 0.24 | 0.62 | — | — | — | — | — |
|  | triethylene diamine | — | — | — | — | — | 0.01 | 0.01 | — | — | — | — | — |
| Properties | nonvolatile content (%) | 60 | 60 | 60 | 60 | 60 | 60 | 60 | 60 | 60 | 60 | 60 | 50 |
|  | hydroxyl value | 57 | 53 | 52 | 50 | 52 | 107 | 18 | 54 | 55 | 52 | 0 | 0 |
|  | weight average mole- | 32,300 | 4,200 | 8,320 | 15,000 | 20,800 | 24,500 | 12,900 | 1,520 | 123,000 | 23,000 | 24,600 | 25,700 |

TABLE 4(c)-continued

| | | Synthesis Example | | | | | | | | | | | |
|---|---|---|---|---|---|---|---|---|---|---|---|---|---|
| | | 46 | 47 | 48 | 49 | 50 | 51 | 52 | 53 | 54 | 55 | 56 | 57 |
| | | | | | | | Acrylic resin No. | | | | | | |
| | | $B_2$-14 | $B_2$-15 | $B_2$-16 | $B_2$-17 | $B_2$-18 | $B_2$-19 | $B_2$-20 | $B_2$-21 | $B_2$-22 | $B_2$-23 | $B_2$-24 | $B_2$-25 |
| | cular weight number of epoxy group in one molecule | — | — | — | — | — | — | — | — | — | — | — | — |
| | number of acetoacetoxy group in one molecule | 1.25 | 0.85 | 1.15 | 2.31 | 1.28 | 1.2 | 1.6 | 1.0 | 1.9 | 0.53 | 1.5 | 1.0 |
| | number of cyclocarbonate group in one molecule | — | — | — | — | — | — | — | — | — | — | — | — |

TABLE 4(d)

| | | Synthesis Example | | | | | | | |
|---|---|---|---|---|---|---|---|---|---|
| | | 58 | 59 | 60 | 61 | 62 | 63 | 64 | 65 |
| | | | | | Acrylic resin No. | | | | |
| | | $B_3$-1 | $B_3$-2 | $B_3$-3 | $B_3$-4 | $B_3$-5 | $B_3$-6 | $B_3$-7 | $B_3$-8 |
| Solvent | xylene | 51.59 | 50.29 | 50.2 | 48.18 | 45.6 | 45.34 | 30 | 20 |
| | isobutyl acetate | — | — | — | — | — | — | — | — |
| | ethyl acetate | — | — | — | — | — | — | — | — |
| | toluene | — | — | — | — | 4 | 4 | 10 | 10 |
| | Solveso #150 | — | — | — | — | — | — | — | 10 |
| Monomer composition | methyl methacrylate | 12.6 | 20.4 | 20.3 | 20.0 | 22.86 | — | 30.07 | 20 |
| | ethyl methacrylate | — | — | 9.9 | — | — | 18.18 | — | — |
| | butyl acrylate | 10.4 | 15.3 | 15.3 | 15.2 | 18 | — | — | — |
| | butyl methacrylate | 10.4 | — | — | 9.1 | 3.57 | 15 | 21 | 10 |
| | hexyl methacrylate | — | 9.4 | — | — | — | — | — | — |
| | lauryl methacrylate | — | — | — | — | — | — | — | — |
| | styrene | 8.3 | — | — | — | — | 10 | — | 10 |
| | 2-hydroxyethyl methacrylate | 5.5 | 3.4 | 3.4 | 4.6 | 5.2 | 6.3 | 7.9 | 7.4 |
| | 4-methacryloyloxymethyl-1,3-dioxolane-2-on | 0.53 | 0.55 | 0.44 | 0.92 | 0.37 | 0.52 | 0.43 | 2.6 |
| | t-butyl peroxy benzoate | 0.68 | 0.66 | 0.46 | 2.0 | 0.4 | 0.66 | 0.6 | 10 |
| Properties | nonvolatile content (%) | 47.7 | 49.1 | 49.3 | 49.8 | 50 | 50 | 60 | 60 |
| | hydroxyl value | 50 | 30 | 30 | 40 | 45 | 55 | 57 | 53 |
| | weight average molecular weight | 20,600 | 19,600 | 24,300 | 9,750 | 25,200 | 21,000 | 32,000 | 4,400 |
| | number of epoxy group in one molecule | — | — | — | — | — | — | — | — |
| | number of acetoacetoxy group in one molecule | — | — | — | — | — | — | — | — |
| | number of cyclocarbonate group in one molecule | 1.2 | 1.2 | 1.2 | 1.0 | 1.0 | 1.2 | 1.25 | 1.2 |

| | | Synthesis Example | | | | | | |
|---|---|---|---|---|---|---|---|---|
| | | 66 | 67 | 68 | 69 | 70 | 71 | 72 |
| | | | | | Acrylic resin No. | | | |
| | | $B_3$-9 | $B_3$-10 | $B_3$-11 | $B_3$-12 | $B_3$-13 | $B_3$-14 | $B_3$-15 |
| Solvent | xylene | 30 | 30 | 30 | 30 | 30 | 45.32 | 44.98 |
| | isobutyl acetate | — | — | — | — | — | — | — |
| | ethyl acetate | — | — | — | — | — | — | — |
| | toluene | 10 | 10 | 10 | 10 | 10 | 4.0 | 3.9 |
| | Solveso #150 | — | — | — | — | — | — | — |
| Monomer composition | methyl methacrylate | — | 20.12 | 12.2 | 19 | 18.95 | — | 25.2 |
| | ethyl methacrylate | — | 10 | — | — | — | 18.2 | — |
| | butyl acrylate | — | 20 | 20 | — | — | — | 12.6 |
| | butyl methacrylate | — | — | — | 10 | 20 | 21.3 | — |
| | hexyl methacrylate | — | — | — | — | — | — | 5.1 |
| | lauryl methacrylate | 16 | — | — | — | — | — | — |
| | styrene | 30 | — | 20 | — | 20 | 10 | 5.5 |
| | 2-hydroxyethyl methacrylate | 7.2 | 7.0 | 7.2 | 7.5 | — | — | — |
| | 4-methacryloyloxymethyl-1,3-dioxolane-2-on | 1.8 | 0.88 | 0.1 | 8.5 | 0.55 | 0.52 | 0.82 |
| | t-butyl peroxy benzoate | 5.0 | 2.0 | 0.5 | 15.0 | 0.5 | 0.66 | 1.9 |
| Properties | nonvolatile content (%) | 60 | 60 | 60 | 60 | 60 | 50 | 51 |
| | hydroxyl value | 52 | 50 | 52 | 54 | 0 | 0 | 0 |
| | weight average molecular weight | 8,400 | 15,200 | 22,300 | 1,530 | 24,300 | 21,100 | 12,500 |
| | number of epoxy group in one molecule | — | — | — | — | — | — | — |
| | number of acetoacetoxy group in one molecule | — | — | — | — | — | — | — |
| | number of cyclocarbonate group in one molecule | 1.15 | 1.2 | 0.2 | 1.2 | 1.2 | 1.2 | 1.1 |

TABLE 5

| | | Example No. 1 | 2 | 3 | 4 | 5 | 6 | 7 | 8 | 9 |
|---|---|---|---|---|---|---|---|---|---|---|
| | | Structure of pigment dispersing agent | | | | | | | | |
| | | $A_1-B_1$ | | | | | | | $A_1-B_2$ | |
| | | Pigment dispersing agent No. | | | | | | | | |
| | | 1 | 2 | 3 | 4 | 5 | 6 | 7 | 8 | 9 |
| Solvent | butanol | 17.05 | 17.32 | 18.0 | — | — | — | — | — | — |
| | ethanol | — | — | — | — | — | — | — | — | — |
| Component $A_1$ | imino bispropyl amine | 0.65 | — | — | — | — | — | — | — | — |
| | triethylene tetramine | — | — | — | — | — | — | — | — | — |
| | Epomine SP006[1] | — | 0.98 | — | — | — | — | — | — | 0.74 |
| | Epomine SP012[1] | — | — | — | — | — | — | — | — | — |
| | Epomine SP018[1] | — | — | 1.9 | — | — | — | — | 4.13 | — |
| | Epomine SP200[1] | — | — | — | 4.5 | — | 4.0 | — | — | — |
| | Epomine SP300[1] | — | — | — | — | 2.5 | — | 2.0 | — | — |
| | polypropylene polyamine PA06[2] | — | — | — | — | — | — | — | — | — |
| Component B Properties | component B No. | $B_1$-1 | $B_1$-2 | $B_1$-3 | $B_1$-4 | $B_1$-5 | $B_1$-6 | $B_1$-7 | $B_2$-1 | $B_2$-2 |
| | formulating amount | 82.3 | 81.7 | 80.1 | 95.5 | 97.5 | 96.0 | 98.0 | 95.87 | 99.26 |
| | $A_1$/B mol ratio | 1/2 | 1/3 | 1/1.8 | 1/1.5 | 1/7.7 | 1/4.7 | 1/22 | 1/1 | 1/2 |
| | amine value | 17 | 21 | 40 | 79 | 44 | 70 | 35 | 109 | 14 |
| | nonvolatile content (%) | 50 | 50 | 50 | 60 | 60 | 60 | 60 | 50 | 50 |
| | hydroxyl value of component B | 40 | 70 | 30 | 77 | 50 | 19 | 27 | 50 | 10 |
| | molecular weight of component B | 5,000 | 10,000 | 25,000 | 80,000 | 90,000 | 30,000 | 40,000 | 19,500 | 21,050 |
| | number of reactive groups in component B[3] | 1.2 | 1.0 | 1.1 | 1.7 | 1.7 | 1.0 | 1.0 | 1.2 | 1.2 |
| Reaction conditions | $A_1$-B temperature (°C.) | 120 | 100 | 120 | 60 | 60 | 60 | 60 | 60 | 60 |
| | reaction time (Hr) | 2 | 4 | 4 | 12 | 12 | 12 | 12 | 2 | 2 |

| | | Example No. 10 | 11 | 12 | 13 | 14 | 15 | 16 | 17 | 18 |
|---|---|---|---|---|---|---|---|---|---|---|
| | | Structure of pigment dispersing agent | | | | | | | | |
| | | $A_1-B_2$ | | | | | | | | |
| | | Pigment dispersing agent No. | | | | | | | | |
| | | 10 | 11 | 12 | 13 | 14 | 15 | 16 | 17 | 18 |
| Solvent | butanol | — | — | — | — | — | — | — | 10.0 | — |
| | ethanol | — | — | — | — | — | — | — | 6.7 | — |
| Component $A_1$ | imino bispropyl amine | — | — | — | — | — | — | — | — | — |
| | triethylene tetramine | — | — | — | — | 0.24 | — | — | — | — |
| | Epomine SP006[1] | — | — | — | — | — | 0.5 | — | — | — |
| | Epomine SP012[1] | — | — | — | — | — | — | — | — | — |
| | Epomine SP018[1] | 1.74 | 1.74 | 1.4 | — | — | — | 1.74 | — | — |
| | Epomine SP200[1] | — | — | — | 5.12 | — | — | — | — | 1.74 |
| | Epomine SP300[1] | — | — | — | — | — | — | — | — | — |
| | polypropylene polyamine PA06[2] | — | — | — | — | — | — | — | 1.05 | — |
| Component B Properties | component B No. | $B_2$-3 | $B_2$-4 | $B_2$-5 | $B_2$-6 | $B_2$-7 | $B_2$-8 | $B_2$-9 | $B_2$-10 | $B_2$-11 |
| | formulating amount | 98.26 | 98.26 | 98.6 | 94.88 | 99.76 | 99.5 | 98.26 | 82.25 | 98.26 |
| | $A_1$/B mol ratio | 1/2.5 | 1/2.5 | 1/2.5 | 1/2.5 | 1/3 | 1/3 | 1/5 | 1/2 | 1/10 |
| | amine value | 46 | 46 | 37 | 134 | 7 | 14 | 37 | 21 | 37 |
| | nonvolatile content (%) | 50 | 50 | 50 | 50 | 50 | 50 | 50 | 50 | 50 |
| | hydroxyl value of component B | 20 | 30 | 30 | 30 | 40 | 40 | 50 | 50 | 62 |
| | molecular weight of component B | 19,800 | 20,100 | 24,900 | 35,700 | 9,820 | 19,900 | 9,800 | 14,000 | 5,300 |
| | number of reactive groups in component B[3] | 1.2 | 1.2 | 1.2 | 1.2 | 1.0 | 1.0 | 1.0 | 1.0 | 0.8 |
| Reaction conditions | $A_1$-B temperature (°C.) | 60 | 60 | 60 | 60 | 60 | 60 | 60 | 60 | 60 |
| | reaction time (Hr) | 2 | 2 | 2 | 2 | 2 | 2 | 2 | 2 | 2 |

| | | Example No. 19 | 20 | 21 | 22 | 23 | 24 | 25 | 26 |
|---|---|---|---|---|---|---|---|---|---|
| | | Structure of pigment dispersing agent | | | | | | | |
| | | $A_1-B_2$ | | | | | | $A_1-B_3$ | |
| | | Pigment dispersing agent No. | | | | | | | |
| | | 19 | 20 | 21 | 22 | 23 | 24 | 25 | 26 |
| Solvent | butanol | 21.37 | 20.73 | — | — | — | — | 21.37 | 20.73 |
| | ethanol | — | — | — | — | — | — | — | — |
| Component $A_1$ | imino bispropyl amine | — | — | — | — | — | — | — | — |
| | triethylene tetramine | — | — | — | — | — | 0.24 | — | — |
| | Epomine SP006[1] | — | — | — | — | — | — | — | — |
| | Epomine SP012[1] | — | 0.77 | — | — | — | — | — | 0.77 |
| | Epomine SP018[1] | 1.33 | — | 4.13 | 1.74 | 1.4 | — | 1.33 | — |
| | Epomine SP200[1] | — | — | — | — | — | — | — | — |
| | Epomine SP300[1] | — | — | — | — | — | — | — | — |
| | polypropylene polyamine | — | — | — | — | — | — | — | — |

TABLE 5-continued

| | PA06[2] component B No. | B₂-12 | B₂-13 | B₃-1 | B₃-2 | B₃-3 | B₃-4 | B₃-5 | B₃-6 |
|---|---|---|---|---|---|---|---|---|---|
| Component B | formulating amount | 77.3 | 78.5 | 95.87 | 98.26 | 98.6 | 99.76 | 77.3 | 78.5 |
| Properties | $A_1/B$ mol ratio | 1/2 | 1/3 | 1/1 | 1/2.5 | 1/2.5 | 1/3 | 1/2 | 1/3 |
| | amine value | 35 | 20 | 109 | 46 | 37 | 7 | 35 | 20 |
| | nonvolatile content (%) | 40 | 40 | 50 | 50 | 50 | 50 | 40 | 40 |
| | hydroxyl value of component B | 45 | 55 | 50 | 30 | 30 | 40 | 45 | 55 |
| | molecular weight of component B | 26,100 | 20,500 | 20,600 | 19,600 | 24,300 | 9,750 | 25,200 | 21,000 |
| | number of reactive groups in component B[3] | 1.0 | 1.2 | 1.2 | 1.2 | 1.2 | 1.0 | 1.0 | 1.2 |
| Reaction conditions | $A_1$-B temperature (°C.) | 60 | 60 | 80 | 80 | 80 | 80 | 100 | 90 |
| | reaction time (Hr) | 2 | 2 | 5 | 5 | 5 | 5 | 4 | 4 |

TABLE 6(a)

| | | Example No. | | | | | | |
|---|---|---|---|---|---|---|---|---|
| | | 27 | 28 | 29 | 30 | 31 | 32 | 33 |
| | | Structure of pigment dispersing agent | | | | | | |
| | | $A_2$-$B_1$-$C_1$ | $A_2$-$B_1$-$C_2$ | $A_2$-$B_1$-$C_3$ | $A_2$-$B_1$-$C_4$ | $A_2$-$B_1$-$C_5$ | $A_2$-$B_1$-$C_6$ | $A_2$-$B_2$-$C_1$ |
| | | Pigment dispersing agent No. | | | | | | |
| | | 27 | 28 | 29 | 30 | 31 | 32 | 33 |
| Solvent | xylene | 10.7 | — | 29.1 | 6.81 | 10.5 | 8.7 | — |
| | butanol | 7.0 | 18 | 5 | — | 7 | 9.3 | 2.2 |
| | ethanol | — | — | — | 10 | — | — | — |
| Component $A_2$ | imino bispropyl amine | — | — | — | 0.59 | — | — | — |
| | triethylene tetramine | — | — | — | — | — | — | — |
| | Epomine SP006[1] | 1.7 | — | — | — | — | — | — |
| | Epomine SP012[1] | — | 1.9 | — | — | 1.3 | — | — |
| | Epomine SP018[1] | — | — | 1.0 | — | — | — | — |
| | Epomine SP200[1] | — | — | — | — | — | — | — |
| | Epomine SP300[1] | — | — | — | — | — | — | — |
| | polypropylene polyamine PA06[2] | — | — | — | — | — | 1.8 | 1.1 |
| Component B | component B No. | $B_1$-2 | $B_1$-3 | $B_1$-6 | $B_1$-1 | $B_1$-3 | $B_1$-2 | $B_2$-1 |
| | formulating amount | 46.3 | 64.6 | 57.5 | 37.5 | 46.4 | 50.5 | 74.3 |
| Component C | component C No. | $C_1$ | $C_2$-2 | $C_3$ | $C_4$ | $C_5$ | $C_6$ | $C_1$ |
| | formulating amount | 34.3 | 15.5 | 7.4 | 45.1 | 34.8 | 29.7 | 22.4 |
| Properties | $A_2/B$ mol ratio | 1/1 | 1/1 | 1/2 | 1/1 | 1/1 | 1/1 | 1/1 |
| | $A_2/C$ mol ratio | 1/2 | 1/5 | 1/3 | 1/1 | 1/4 | 1/2 | 1/2 |
| | amine value | 36 | 40 | 26 | 15 | 27 | 46 | 28 |
| | nonvolatile content (%) | 50 | 50 | 40 | 50 | 50 | 50 | 50 |
| | hydroxyl value of component B | 70 | 30 | 19 | 40 | 30 | 70 | 50 |
| | molecular weight of component B | 10,000 | 25,000 | 30,000 | 5,000 | 25,000 | 10,000 | 19,500 |
| | number of reactive groups in component B[3] | 1.0 | 1.1 | 1.0 | 1.2 | 1.1 | 1.0 | 1.2 |
| | molecular weight of component C | 3,700 | 1,200 | 2,580 | 6,000 | 4,670 | 2,960 | 3,700 |
| Reaction conditions | $A_2$-B temperature (°C.) | 120 | 120 | 100 | 120 | 120 | 120 | 60 |
| | reaction time (Hr) | 4 | 4 | 4 | 4 | 4 | 4 | 2 |
| | $A_2$-C temperature (°C.) | 50 | 50 | 30 | 60 | 30 | 60 | 30 |
| | reaction time (Hr) | 2 | 2 | 4 | 2 | 2 | 2 | 4 |

TABLE 6(b)

| | | Example No. | | | | | | |
|---|---|---|---|---|---|---|---|---|
| | | 34 | 35 | 36 | 37 | 38 | 39 | 40 |
| | | Structure of pigment dispersing agent | | | | | | |
| | | $A_2$-$B_2$-$C_2$ | | | | | | $A_2$-$B_2$-$C_3$ |
| | | Pigment dispersing agent No. | | | | | | |
| | | 34 | 35 | 36 | 37 | 38 | 39 | 40 |
| Solvent | xylene | — | 7.7 | — | — | — | — | — |
| | butanol | 1.05 | 10 | 0.57 | 1.79 | 1.53 | 1.3 | 4.5 |
| | ethanol | — | — | — | — | — | — | — |
| Component $A_2$ | imino bispropyl amine | — | — | — | — | — | — | — |
| | triethylene tetramine | — | — | 0.82 | — | — | — | — |
| | Epomine SP006[1] | — | — | — | 2.68 | — | — | — |
| | Epomine SP012[1] | 1.71 | — | — | — | — | — | 1.8 |
| | Epomine SP018[1] | — | 1.6 | — | — | 2.29 | 1.95 | — |
| | Epomine SP200[1] | — | — | — | — | — | — | — |
| | Epomine SP300[1] | — | — | — | — | — | — | — |
| | polypropylene polyamine PA06[2] | — | — | — | — | — | — | — |
| Component B | component B No. | $B_2$-14 | $B_2$-19 | $B_2$-15 | $B_2$-16 | $B_2$-17 | $B_2$-18 | $B_2$-5 |
| | formulating amount | 77.0 | 71.0 | 76.71 | 62.0 | 63.61 | 56.32 | 74.6 |
| Component | component C No. | $C_2$-1 | $C_2$-3 | $C_2$-2 | $C_2$-3 | $C_2$-4 | $C_2$-5 | $C_3$ |

TABLE 6(b)-continued

| | | Example No. | | | | | | |
|---|---|---|---|---|---|---|---|---|
| | | 34 | 35 | 36 | 37 | 38 | 39 | 40 |
| | | Structure of pigment dispersing agent | | | | | | |
| | | | $A_2$-$B_2$-$C_2$ | | | | | $A_2$-$B_2$-$C_3$ |
| | | Pigment dispersing agent No. | | | | | | |
| | | 34 | 35 | 36 | 37 | 38 | 39 | 40 |
| C | formulating amount | 20.24 | 9.7 | 21.9 | 33.53 | 32.57 | 40.43 | 19.1 |
| Properties | $A_2$/B mol ratio | 1/1 | 1/2 | 1/3.3 | 1/1.7 | 1/3.3 | 1/2.6 | 1/1 |
| | $A_2$/C mol ratio | 1/1 | 1/3 | 1/2.7 | 1/1.5 | 1/5 | 1/3.4 | 1/3 |
| | amine value | 30 | 34 | 21 | 47 | 40 | 34 | 38 |
| | nonvolatile content (%) | 60 | 50 | 60 | 60 | 60 | 60 | 50 |
| | hydroxyl value of component B | 57 | 107 | 53 | 52 | 50 | 52 | 30 |
| | molecular weight of component B | 32,300 | 24,500 | 4,200 | 8,320 | 15,000 | 20,800 | 24,900 |
| | number of reactive groups in component B[3] | 1.25 | 1.2 | 0.85 | 1.15 | 2.31 | 1.28 | 1.2 |
| | molecular weight of component C | 8,500 | 2,250 | 1,200 | 2,250 | 5,120 | 11,200 | 2,580 |
| Reaction conditions | $A_2$-B temperature (°C.) | 60 | 60 | 60 | 60 | 60 | 60 | 60 |
| | reaction time (Hr) | 2 | 2 | 2 | 2 | 2 | 2 | 2 |
| | $A_2$-C temperature (°C.) | 60 | 60 | 50 | 60 | 60 | 60 | 30 |
| | reaction time (Hr) | 2 | 3 | 2 | 2 | 2 | 2 | 3 |

TABLE 6(c)

| | | Example No. | | | | | | |
|---|---|---|---|---|---|---|---|---|
| | | 41 | 42 | 43 | 44 | 45 | 46 | 47 |
| | | Structure of pigment dispersing agent | | | | | | |
| | | $A_2$-$B_2$-$C_4$ | $A_2$-$B_2$-$C_5$ | $A_2$-$B_2$-$C_6$ | $A_2$-$B_3$-$C_1$ | $A_2$-$B_3$-$C_2$ | | |
| | | Pigment dispersing agent No. | | | | | | |
| | | 41 | 42 | 43 | 44 | 45 | 46 | 47 |
| Solvent | xylene | — | 12.8 | 7.1 | 13.7 | — | — | — |
| | butanol | 4.5 | 5 | — | 6 | 1.05 | 0.57 | 1.79 |
| | ethanol | — | — | 10.0 | — | — | — | — |
| Component $A_2$ | imino bispropyl amine | — | — | 0.6 | — | — | — | — |
| | triethylene tetramine | — | — | — | — | — | 0.82 | — |
| | Epomine SP006[1] | — | — | — | — | — | — | 2.68 |
| | Epomine SP012[1] | — | — | — | 1.0 | 1.71 | — | — |
| | Epomine SP018[1] | 1.4 | — | — | — | — | — | — |
| | Epomine SP200[1] | — | — | — | — | — | — | — |
| | Epomine SP300[1] | — | — | — | — | — | — | — |
| | polypropylene polyamine PA06[2] | — | 1.7 | — | — | — | — | — |
| Component B | component B No. | $B_2$-12 | $B_2$-20 | $B_2$-16 | $B_3$-1 | $B_3$-7 | $B_3$-8 | $B_3$-9 |
| | formulating amount | 79.1 | 59.2 | 60.8 | 69.4 | 77.0 | 76.71 | 62.0 |
| Component C | component C No. | $C_4$ | $C_5$ | $C_6$ | $C_1$ | $C_2$-1 | $C_2$-2 | $C_2$-3 |
| | formulating amount | 15.0 | 21.3 | 21.5 | 9.9 | 20.24 | 21.9 | 33.53 |

TABLE 6(C)-2

| | | Example No. | | | | | | |
|---|---|---|---|---|---|---|---|---|
| | | 41 | 42 | 43 | 44 | 45 | 46 | 47 |
| Properties | $A_2$/B mol ratio | 1/2 | 1/1 | 1/1 | 1/2 | 1/1 | 1/3.3 | 1/1.7 |
| | $A_2$/C mol ratio | 1/2 | 1/1 | 1/1 | 1/2 | 1/1 | 1/2.7 | 1/1.5 |
| | amine value | 29 | 36 | 15 | 26 | 30 | 21 | 47 |
| | nonvolatile content (%) | 50 | 50 | 50 | 40 | 60 | 60 | 60 |
| | hydroxyl value of component B | 45 | 18 | 52 | 50 | 57 | 53 | 52 |
| | molecular weight of component B | 26,100 | 12,900 | 8,320 | 20,600 | 32,000 | 4,400 | 8,400 |
| | number of reactive groups in component B[3] | 1.0 | 1.6 | 1.15 | 1.2 | 1.25 | 1.2 | 1.15 |
| | molecular weight of component C | 6,000 | 4,670 | 2,960 | 3,700 | 8,500 | 1,200 | 2,250 |
| Reaction conditions | $A_2$-B temperature (°C.) | 80 | 70 | 60 | 70 | 80 | 80 | 80 |
| | reaction time (Hr) | 1 | 2 | 2 | 2 | 5 | 5 | 5 |
| Reaction conditions | $A_2$-C temperature (°C.) | 50 | 30 | 60 | 30 | 50 | 50 | 60 |
| | reaction time (Hr) | 3 | 4 | 2 | 4 | 2 | 2 | 2 |

TABLE 6(D)-1

| | | Example No. | | | | | |
|---|---|---|---|---|---|---|---|
| | | 48 | 49 | 50 | 51 | 52 | 53 |
| Structure of pigment dispersing agent | | $A_2$-$B_3$-$C_2$ | $A_2$-$B_3$-$C_3$ | $A_2$-$B_3$-$C_4$ | $A_2$-$B_3$-$C_5$ | $A_2$-$B_3$-$C_6$ | |
| Pigment dispersing agent No. | | 48 | 49 | 50 | 51 | 52 | 53 |
| Solvent | xylene | — | 9.4 | 12.7 | — | 23.8 | 8 |
| | butanol | 1.53 | 12 | 5 | 3.8 | 5 | 10 |
| | ethanol | — | — | — | — | — | — |
| Component $A_1$ | imino bispropyl amine | — | — | — | — | — | — |

TABLE 6(D)-1-continued

| | | Example No. | | | | | |
|---|---|---|---|---|---|---|---|
| | | 48 | 49 | 50 | 51 | 52 | 53 |
| | triethylene tetramine | — | — | — | — | — | — |
| | Epomine SP006[1] | — | — | — | — | — | — |
| | Epomine SP012[1] | — | — | 1.6 | — | — | — |
| | Epomine SP018[1] | 2.29 | 1.3 | — | 1.8 | — | — |
| | Epomine SP200[1] | — | — | — | — | 6.8 | — |
| | Epomine SP300[1] | — | — | — | — | — | — |
| | polypropylene polyamine PA06[2] | — | — | — | — | — | 2.0 |
| Component B | component B No. | $B_3$-10 | $B_3$-3 | $B_3$-10 | $B_3$-6 | $B_3$-4 | $B_3$-9 |
| | formulating amount | 63.61 | 71.8 | 64.2 | 84.4 | 53.7 | 46.7 |
| Component C | component C No. | $C_2$-4 | $C_2$-3 | $C_3$ | $C_4$ | $C_5$ | $C_6$ |
| | formulating amount | 32.57 | 5.5 | 16.5 | 10.0 | 10.7 | 33.3 |

TABLE 6(D)-2

| | | | Example No. | | | | | |
|---|---|---|---|---|---|---|---|---|
| | | | 48 | 49 | 50 | 51 | 52 | 53 |
| Properties | | $A_2$/B mol ratio | 1/3.3 | 1/2 | 1/2 | 1/2 | 1/4 | 1/1 |
| | | $A_2$/C mol ratio | 1/5 | 1/2 | 1/3 | 1/1 | 1/2 | 1/2 |
| | | amine value | 40 | 34 | 34 | 38 | 179 | 61 |
| | | nonvolatile content (%) | 60 | 40 | 50 | 50 | 40 | 50 |
| | | hydroxyl value of component B | 50 | 30 | 50 | 55 | 40 | 52 |
| | | molecular weight of component B | 15,200 | 24,300 | 15,200 | 21,000 | 9,750 | 8,400 |
| | | number of reactive groups in component B[3] | 1.2 | 1.2 | 1.2 | 1.2 | 1.0 | 1.15 |
| | | molecular weight of component C | 5,120 | 2,250 | 2,580 | 6,000 | 4,670 | 2,960 |
| Reaction conditions | $A_2$-B reaction | temperature (°C.) | 80 | 80 | 100 | 90 | 80 | 70 |
| | | time (Hr) | 5 | 5 | 3 | 4 | 5 | 4 |
| Reaction conditions | $A_2$-C reaction | temperature (°C.) | 60 | 50 | 30 | 50 | 30 | 60 |
| | | time (Hr) | 2 | 3 | 3 | 4 | 3 | 3 |

Note:
[1] Epomine: trade name of polyethylene imine having the following molecular weight and amine value, made by Nippon Shokubai Kagaku Kogyo K.K.

| Trade namer | Molecular weight | Amine value |
|---|---|---|
| Epomine SP006 | 600 | 1050 |
| Epomine SP012 | 1,200 | 1050 |
| Epomine SP018 | 1,800 | 1050 |
| Epomine SP200 | 10,000 | 1050 |
| Epomine SP300 | 30,000 | 1050 |

[2] trade name, made by Toso K.K., molecular weight: 600, amine value: 1100
[3] Number of reaction group in component B is number of glycidyl, acetoacetoxy or cyclocarbonate groups per one molecule of component B

TABLE 7(A)-1

| | | Application Example | | | | | | | | | |
|---|---|---|---|---|---|---|---|---|---|---|---|
| | | 1 | 2 | 3 | 4 | 5 | 6 | 7 | 8 | 9 | 10 |
| Pigment dispersing agent No.[1] | | 1 | 2 | 3 | 4 | 5 | 6 | 7 | 8 | 9 | 10 |
| Acrylic resin No.[2] | | AC-1 | AC-2 | AC-3 | AC-4 | AC-5 | AC-6 | AC-7 | AC-8 | AC-8 | AC-8 |
| Polyester resin No.[3] | | — | — | — | — | — | — | — | — | — | — |
| Formulation of dispersion paste | pigment dispersing agent | 16.0 | 6.0 | 15.0 | 2.9 | 1.2 | 2.9 | 2.9 | 1.9 | 7.5 | 3.8 |
| | acrylic resin | 40.0 | 36.7 | 29.2 | 52.0 | 20.8 | 52.0 | 52.0 | 60.8 | 55.2 | 58.9 |
| | polyester resin | — | — | — | — | — | — | — | — | — | — |
| | xylene | 18.0 | 22.3 | 20.8 | 13.3 | 30.0 | 22.3 | 22.3 | 9.2 | 9.2 | 9.2 |
| | ethyl cellosolve | — | — | — | — | — | — | — | 9.3 | 9.3 | 9.3 |
| | butyl cellosolve | — | — | — | — | 10.4 | 4.0 | 4.0 | — | — | — |
| | cellosolve acetate | 18.0 | 20.0 | 20.0 | 13.0 | — | — | — | — | — | — |
| | titanium dioxide JR 602[4] | — | — | — | — | 37.6 | — | — | — | — | — |
| | carbon black FW-200[5] | 8.0 | — | — | — | — | — | — | — | — | — |
| | Fosterperm Yellow-H3G[6] | — | — | — | 18.8 | — | — | 18.8 | — | — | — |
| | Fastogen Blue-RGA[7] | — | — | — | — | — | 18.8 | — | — | 18.8 | — |
| | Paliogen Maroon L3820[8] | — | — | 15.0 | — | — | — | — | 18.8 | — | — |
| | Rubicron Red 500RG[9] | — | — | — | — | — | — | — | — | — | 18.8 |
| | Paliotol Red L3670[10] | — | — | — | — | — | — | — | — | — | — |
| | Paliogen Violet L-5080[11] | — | — | — | — | — | — | — | — | — | — |
| | Noboperm Red F3RK-70[12] | — | 15.0 | — | — | — | — | — | — | — | — |
| | Irgazine Red BPT[13] | — | — | — | — | — | — | — | — | — | — |

| | Application Example | | | | | |
|---|---|---|---|---|---|---|
| | 11 | 12 | 13 | 14 | 15 | 16 |
| Pigment dispersing agent No.[1] | 11 | 12 | 13 | 14 | 15 | 16 |
| Acrylic resin No.[2] | AC-8 | AC-8 | AC-8 | AC-8 | AC-8 | AC-8 |
| Polyester resin No.[3] | — | — | — | — | — | — |

TABLE 7(A)-1-continued

| Formulation of dispersion paste | | | | | | | |
|---|---|---|---|---|---|---|---|
| pigment dispersing agent | | 3.8 | 3.8 | 1.9 | 3.8 | 11.3 | 7.5 |
| acrylic resin | | 58.9 | 58.9 | 60.8 | 21.3 | 51.4 | 55.2 |
| polyester resin | | — | — | — | — | — | — |
| xylene | | 9.2 | 9.2 | 9.2 | 18.6 | 9.2 | 9.2 |
| ethyl cellosolve | | 9.3 | 9.3 | 9.3 | 18.7 | 9.3 | 9.3 |
| butyl cellosolve | | — | — | — | — | — | — |
| cellosolve acetate | | — | — | — | — | — | — |
| titanium dioxide JR 602[4] | | — | — | — | 37.6 | — | — |
| carbon black FW-200[5] | | — | — | — | — | — | — |
| Fosterperm Yellow-H3G[6] | | — | — | — | — | — | — |
| Fastogen Blue-RGA[7] | | — | 18.8 | — | — | — | 18.8 |
| Paliogen Maroon L3820[8] | | 18.8 | — | — | — | 18.8 | — |
| Rubicron Red 500RG[9] | | — | — | 18.8 | — | — | — |
| Paliotol Red L3670[10] | | — | — | — | — | — | — |
| Paliogen Violet L-5080[11] | | — | — | — | — | — | — |
| Noboperm Red F3RK-70[12] | | — | — | — | — | — | — |
| Irgazine Red BPT[13] | | — | — | — | — | — | — |

TABLE 7(A)-2

| | | Application Example | | | | | | | | |
|---|---|---|---|---|---|---|---|---|---|---|
| | | 1 | 2 | 3 | 4 | 5 | 6 | 7 | 8 | 9 |
| Properties of paste | amount of pigment dispersing agent added (%)[14] | 100 | 20 | 50 | 10 | 2 | 10 | 10 | 5 | 20 |
| | viscosity of dispersion paste (CP)[15] | 520 | 160 | 240 | 82 | 38 | 66 | 92 | 5300 | 3800 |
| | storage stability of dispersion paste[16] | good | good | good | good | good | good | good | good | good |
| Formulation of paint | dispersion paste | 30.5 | 52.0 | 52.0 | 44.2 | 59.1 | 44.2 | 44.2 | 44.2 | 44.2 |
| | acrylic resin | 40.6 | 23.8 | 23.8 | 24.2 | 20.1 | 24.2 | 24.2 | 29.0 | 29.0 |
| | polyester resin | — | — | — | — | — | — | — | — | — |
| | melamine resin[17] | 24.4 | 19.5 | 19.5 | 20.8 | 13.9 | 20.8 | 20.8 | 20.8 | 20.8 |
| | leveling agent[18] | 0.6 | 0.6 | 0.6 | 0.6 | 0.5 | 0.6 | 0.6 | 0.6 | 0.6 |
| | thinner[19] | 3.9 | 4.1 | 4.1 | 10.2 | 6.4 | 10.2 | 10.2 | 5.4 | 5.4 |
| Properties of paint film | 30° specular gloss | 90 | 80 | 87 | 84 | 88 | 84 | 82 | 83 | 85 |
| | humidity resistance[20] | good | good | good | good | good | good | good | good | good |
| | weather resistance[21] | 82 | 85 | 89 | 88 | 90 | 91 | 85 | 81 | 86 |
| | absence or presence of bleeding[22] | absence | absence | absence | absence | absence | absence | absence | absence | absence |

| | | Application Example | | | | | | |
|---|---|---|---|---|---|---|---|---|
| | | 10 | 11 | 12 | 13 | 14 | 15 | 16 |
| Properties of paste | amount of pigment dispersing agent added (%)[14] | 10 | 10 | 10 | 5 | 5 | 30 | 20 |
| | viscosity of dispersion paste (CP)[15] | 2400 | 1200 | 4200 | 1300 | 6000 | 900 | 4900 |
| | storage stability of dispersion paste[16] | good | good | good | good | good | good | good |
| Formulation of paint | dispersion paste | 44.2 | 59.9 | 44.2 | 44.2 | 59.1 | 44.2 | 44.2 |
| | acrylic resin | 29.0 | 16.0 | 29.0 | 29.0 | 24.1 | 29.0 | 29.0 |
| | polyester resin | — | — | — | — | — | — | — |
| | melamine resin[17] | 20.8 | 20.1 | 20.8 | 20.8 | 13.9 | 20.8 | 20.8 |
| | leveling agent[18] | 0.6 | 0.6 | 0.6 | 0.6 | 0.6 | 0.6 | 0.6 |
| | thinner[19] | 5.4 | 3.4 | 5.4 | 5.4 | 2.3 | 5.4 | 5.4 |
| Properties of paint film | 30° specular gloss | 86 | 82 | 87 | 88 | 82 | 85 | 80 |
| | humidity resistance[20] | good | good | good | good | good | good | good |
| | weather resistance[21] | 89 | 88 | 85 | 86 | 88 | 85 | 89 |
| | absence or presence of bleeding[22] | absence | absence | absence | absence | absence | absence | absence |

TABLE 7(B)-1

| | Application Example | | | | | | | | | |
|---|---|---|---|---|---|---|---|---|---|---|
| | 17 | 18 | 19 | 20 | 21 | 22 | 23 | 24 | 25 | 26 |
| Pigment dispersing agent No.[1] | 17 | 18 | 19 | 20 | 21 | 22 | 23 | 24 | 25 | 26 |
| Acrylic resin No.[2] | AC-2 | AC-8 | AC-3 | AC-9 | AC-8 | AC-8 | AC-8 | AC-8 | AC-8 | AC-8 |
| Polyester resin No.[3] | — | — | — | — | — | — | — | — | — | — |

TABLE 7(B)-1-continued

| | | | | | | | | | | | |
|---|---|---|---|---|---|---|---|---|---|---|---|
| Formulation of dispersion paste | pigment dispersing agent | 6.0 | 13.4 | 6.0 | 6.0 | 1.9 | 3.8 | 3.8 | 3.8 | 7.5 | 7.5 |
| | acrylic resin | 36.7 | 67 | 36.7 | 36.7 | 60.8 | 58.9 | 58.9 | 21.3 | 36.7 | 36.7 |
| | polyester resin | — | — | — | — | — | — | — | — | — | — |
| | xylene | 22.3 | 6.4 | 22.3 | 22.3 | 9.2 | 9.2 | 9.2 | 18.6 | 20.0 | 20.0 |
| | ethyl cellosolve | — | 6.4 | — | — | 9.3 | 9.3 | 9.3 | 18.7 | — | — |
| | butyl cellosolve | — | — | — | — | — | — | — | — | — | — |
| | cellosolve acetate | 20.0 | — | 20.0 | 20.0 | — | — | — | — | 20.8 | 20.8 |
| | titanium dioxide JR 602[4] | — | — | — | — | — | — | — | 37.6 | — | — |
| | carbon black FW-200[5] | — | 6.7 | — | — | — | — | — | — | — | — |
| | Fosterperm Yellow-H3G[6] | — | — | — | — | — | — | — | — | — | — |
| | Fastogen Blue-RGA[7] | — | — | — | — | — | — | 18.8 | — | — | — |
| | Paliogen Maroon L3820[8] | — | — | — | — | 18.8 | 18.8 | — | — | — | — |
| | Rubicron Red 500RG[9] | — | — | — | 15.0 | — | — | — | — | 15.0 | — |
| | Paliotol Red L3670[10] | — | — | — | — | — | — | — | — | — | — |
| | Paliogen Violet L-5080[11] | — | — | — | — | — | — | — | — | — | — |
| | Noboperm Red F3RK-70[12] | 15.0 | — | — | — | — | — | — | — | — | 15.0 |
| | Irgazine Red BPT[13] | — | — | 15.0 | — | — | — | — | — | — | — |

| | | Application Example | | | | | |
|---|---|---|---|---|---|---|---|
| | | 27 | 28 | 29 | 30 | 31 | 32 |
| | Pigment dispersing agent No.[1] | 27 | 27 | 28 | 29 | 29 | 30 |
| | Acrylic resin No.[2] | AC-1 | — | AC-6 | AC-2 | — | AC-6 |
| | Polyester resin No.[3] | — | PE-1 | — | — | PE-2 | — |
| Formulation of dispersion paste | pigment dispersing agent | 16.0 | 20 | 6.0 | 18.8 | 23.5 | 16.0 |
| | acrylic resin | 40.0 | — | 36.7 | 29.2 | — | 40.0 |
| | polyester resin | — | 50 | — | — | 36.5 | — |
| | xylene | 18.0 | 10 | 22.3 | 17.0 | — | 18.0 |
| | ethyl cellosolve | — | — | — | — | — | — |
| | butyl cellosolve | — | — | — | — | — | — |
| | cellosolve acetate | 18.0 | 10 | 20.0 | 20.0 | — | 18.0 |
| | titanium dioxide JR 602[4] | — | — | — | — | — | — |
| | carbon black FW-200[5] | 8.0 | 10 | — | — | — | 8.0 |
| | Fosterperm Yellow-H3G[6] | — | — | — | — | — | — |
| | Fastogen Blue-RGA[7] | — | — | — | — | — | — |
| | Paliogen Maroon L3820[8] | — | — | — | 15.0 | 18.8 | — |
| | Rubicron Red 500RG[9] | — | — | — | — | — | — |
| | Paliotol Red L3670[10] | — | — | — | — | — | — |
| | Paliogen Violet L-5080[11] | — | — | — | — | — | — |
| | Noboperm Red F3RK-70[12] | — | — | — | — | — | — |
| | Irgazine Red BPT[13] | — | — | 15.0 | — | — | — |

TABLE 7(B)-2

| | | Application Example | | | | | | | | |
|---|---|---|---|---|---|---|---|---|---|---|
| | | 17 | 18 | 19 | 20 | 21 | 22 | 23 | 24 | 25 |
| Properties of paste | amount of pigment dispersing agent added (%)[14] | 20 | 100 | 20 | 20 | 5 | 10 | 10 | 5 | 20 |
| | viscosity of dispersion paste (CP)[15] | 270 | 2500 | 240 | 350 | 5600 | 1800 | 3800 | 6300 | 2100 |
| | storage stability of dispersion paste[16] | good | good | good | good | good | good | good | good | good |
| Formulation of paint | dispersion paste | 52.0 | 59.9 | 52.0 | 52.0 | 44.2 | 59.9 | 44.2 | 59.1 | 52.0 |
| | acrylic resin | 23.8 | 16.0 | 23.8 | 23.8 | 29.0 | 16.0 | 29.0 | 24.1 | 23.8 |
| | polyester resin | — | — | — | — | — | — | — | — | — |
| | melamine resin[17] | 19.5 | 20.1 | 19.5 | 19.5 | 20.8 | 20.1 | 20.8 | 13.9 | 19.5 |
| | leveling agent[18] | 0.6 | 0.6 | 0.6 | 0.6 | 0.6 | 0.6 | 0.6 | 0.6 | 0.6 |
| | thinner[19] | 4.1 | 3.4 | 4.1 | 4.1 | 5.6 | 3.2 | 4.9 | 2.0 | 4.1 |
| Properties of paint film | 30° specular gloss | 85 | 80 | 87 | 87 | 83 | 79 | 85 | 81 | 84 |
| | humidity resistance[20] | good | good | good | good | good | good | good | good | good |
| | weather resistance[21] | 88 | 88 | 90 | 87 | 80 | 89 | 84 | 85 | 88 |
| | absence or presence of bleeding[22] | absence | absence | absence | absence | absence | absence | absence | absence | absence |

| | | Application Example | | | | | | |
|---|---|---|---|---|---|---|---|---|
| | | 26 | 27 | 28 | 29 | 30 | 31 | 32 |
| Properties of paste | amount of pigment dispersing agent added (%)[14] | 20 | 100 | 100 | 20 | 50 | 50 | 100 |
| | viscosity of dispersion paste (CP)[15] | 1500 | 420 | 460 | 260 | 320 | 410 | 480 |
| | storage stability of dispersion paste[16] | good | good | good | good | good | good | good |

TABLE 7(B)-2-continued

|  |  | | | | | | | |
|---|---|---|---|---|---|---|---|---|
| Formulation of paint | dispersion paste | 52.0 | 30.5 | 25.9 | 52.0 | 52.0 | 46.7 | 30.5 |
|  | acrylic resin | 23.8 | 40.6 | — | 23.8 | 23.8 | — | 40.6 |
|  | polyester resin | — | — | 43.1 | — | — | 26.8 | — |
|  | melamine resin[17] | 19.5 | 24.4 | 25.9 | 19.5 | 19.5 | 21.9 | 24.4 |
|  | leveling agent[18] | 0.6 | 0.6 | 0.6 | 0.6 | 0.6 | 0.6 | 0.6 |
|  | thinner[19] | 4.1 | 3.9 | 4.5 | 4.1 | 4.1 | 4.0 | 3.9 |
| Properties of paint film | 30° specular gloss | 86 | 84 | 88 | 85 | 87 | 90 | 88 |
|  | humidity resistance[20] | good | good | good | good | good | good | good |
|  | weather resistance[21] | 87 | 90 | 92 | 90 | 84 | 88 | 84 |
|  | absence or presence of bleeding[22] | absence | absence | absence | absence | absence | absence | absence |

TABLE 7(C)-1

|  |  | Application Example | | | | | | | | | |
|---|---|---|---|---|---|---|---|---|---|---|---|
|  |  | 33 | 34 | 35 | 36 | 37 | 38 | 39 | 40 | 41 | 42 |
| Pigment dispersing agent No.[1] | | 31 | 32 | 33 | 33 | 33 | 34 | 34 | 35 | 36 | 37 |
| Acrylic resin No.[2] | | AC-6 | AC-6 | AC-8 | — | — | — | AC-9 | AC-9 | — | AC-9 |
| Polyester resin No.[3] | | — | — | — | PE-1 | PE-2 | PE-1 | — | — | PE-1 | — |
| Formulation of dispersion paste | pigment dispersing agent | 9.0 | 6.0 | 6.0 | 7.5 | 7.5 | 5.8 | 7.5 | 6.0 | 5.8 | 5.8 |
|  | acrylic resin | 34.2 | 36.7 | 36.7 | — | — | — | 34.2 | 36.7 | — | 49.1 |
|  | polyester resin | — | — | — | 45.8 | 45.8 | 49.1 | — | — | 49.1 | — |
|  | xylene | 21.8 | 22.3 | 22.3 | 12.9 | 12.9 | 22.3 | 23.3 | 22.3 | 22.3 | 22.3 |
|  | ethyl cellosolve | — | — | — | — | — | — | — | — | — | — |
|  | butyl cellosolve | — | — | — | — | — | — | — | — | — | — |
|  | cellosolve acetate | 20.0 | 20.0 | 20.0 | 15 | 15 | 4.0 | 20.0 | 20.0 | 4.0 | 4.0 |
|  | titanium dioxide JR 602[4] | — | — | — | — | — | — | — | — | — | — |
|  | carbon black FW-200[5] | — | — | — | — | — | — | — | — | — | — |
|  | Fosterperm Yellow-H3G[6] | — | — | — | — | — | — | 15.0 | — | — | — |
|  | Fastogen Blue-RGA[7] | 15.0 | — | — | — | — | — | — | — | — | — |
|  | Paliogen Maroon L3820[8] | — | — | — | — | — | — | — | — | — | — |
|  | Rubicron Red 500RG[9] | — | — | 15.0 | 18.8 | 18.8 | — | — | — | 18.8 | — |
|  | Paliotol Red L3670[10] | — | 15.0 | — | — | — | 18.8 | — | 15.0 | — | — |
|  | Paliogen Violet L-5080[11] | — | — | — | — | — | — | — | — | — | 18.8 |
|  | Noboperm Red F3RK-70[12] | — | — | — | — | — | — | — | — | — | — |
|  | Irgazine Red BPT[13] | — | — | — | — | — | — | — | — | — | — |

|  |  | Application Example | | | | | |
|---|---|---|---|---|---|---|---|
|  |  | 43 | 44 | 45 | 46 | 47 | 48 |
| Pigment dispersing agent No.[1] | | 38 | 39 | 40 | 40 | 40 | 41 |
| Acrylic resin No.[2] | | AC-9 | AC-9 | AC-9 | — | — | AC-9 |
| Polyester resin No.[3] | | — | — | — | PE-1 | PE-2 | — |
| Formulation of dispersion paste | pigment dispersing agent | 5.8 | 5.8 | 6.0 | 7.5 | 7.5 | 21.0 |
|  | acrylic resin | 49.1 | 49.1 | 36.7 | — | — | 24.2 |
|  | polyester resin | — | — | — | 45.8 | 45.8 | — |
|  | xylene | 22.3 | 22.3 | 22.3 | 12.9 | 12.9 | 19.8 |
|  | ethyl cellosolve | — | — | — | — | — | — |
|  | butyl cellosolve | — | — | — | — | — | — |
|  | cellosolve acetate | 4.0 | 4.0 | 20.0 | 15 | 15 | 20.0 |
|  | titanium dioxide JR 602[4] | — | — | — | — | — | — |
|  | carbon black FW-200[5] | — | — | — | — | — | — |
|  | Fosterperm Yellow-H3G[6] | — | — | — | — | — | — |
|  | Fastogen Blue-RGA[7] | — | 18.8 | — | — | — | — |
|  | Paliogen Maroon L3820[8] | — | — | — | — | — | 15.0 |
|  | Rubicron Red 500RG[9] | — | — | — | — | — | — |
|  | Paliotol Red L3670[10] | — | — | — | — | — | — |
|  | Paliogen Violet L-5080[11] | — | — | — | — | — | — |
|  | Noboperm Red F3RK-70[12] | 18.8 | — | — | — | — | — |
|  | Irgazine Red BPT[13] | — | — | 15.0 | 18.8 | 18.8 | — |

TABLE 7(C)-2

|  |  | Application Example | | | | | | | | |
|---|---|---|---|---|---|---|---|---|---|---|
|  |  | 33 | 34 | 35 | 36 | 37 | 38 | 39 | 40 | 41 |
| Properties of paste | amount of pigment dispersing agent added (%)[14] | 30 | 20 | 20 | 20 | 20 | 20 | 30 | 20 | 20 |
|  | viscosity of dispersion paste (CP)[15] | 370 | 720 | 340 | 460 | 390 | 213 | 420 | 370 | 253 |
|  | storage stability of dispersion paste[16] | good | good | good | good | good | good | good | good | good |
| Formulation of paint | dispersion paste | 51.7 | 52.0 | 52.0 | 46.7 | 46.7 | 44.2 | 51.7 | 52.0 | 44.2 |
|  | acrylic resin | 23.7 | 23.7 | 23.8 | — | — | — | 23.7 | 23.8 | — |
|  | polyester resin | — | — | — | 26.8 | 26.8 | 24.2 | — | — | 24.2 |

TABLE 7(C)-2-continued

|  |  |  |  |  |  |  |  |  |  |  |
|---|---|---|---|---|---|---|---|---|---|---|
|  | melamine resin[17] | 19.4 | 19.5 | 19.5 | 21.9 | 21.9 | 20.8 | 19.4 | 19.5 | 20.8 |
|  | leveling agent[18] | 0.6 | 0.6 | 0.6 | 0.6 | 0.6 | 0.6 | 0.6 | 0.6 | 0.6 |
|  | thinner[19] | 4.6 | 4.2 | 4.1 | 4.0 | 4.0 | 10.2 | 4.6 | 4.1 | 10.2 |
| Properties of paint film | 30° specular gloss | 83 | 86 | 84 | 86 | 84 | 82 | 84 | 82 | 84 |
|  | humidity resistance[20] | good | good | good | good | good | good | good | good | good |
|  | weather resistance[21] | 87 | 87 | 83 | 86 | 88 | 83 | 87 | 80 | 85 |
|  | absence or presence of bleeding[22] | absence | absence | absence | absence | absence | absence | absence | absence | absence |

| | | Application Example | | | | | | |
|---|---|---|---|---|---|---|---|---|
| | | 42 | 43 | 44 | 45 | 46 | 47 | 48 |
| Properties of paste | amount of pigment dispersing agent added (%)[14] | 20 | 20 | 20 | 20 | 20 | 20 | 70 |
|  | viscosity of dispersion paste (CP)[15] | 263 | 218 | 289 | 490 | 360 | 350 | 420 |
|  | storage stability of dispersion paste[16] | good | good | good | good | good | good | good |
| Formulation of paint | dispersion paste | 44.2 | 44.2 | 44.2 | 52.0 | 46.7 | 46.7 | 51.7 |
|  | acrylic resin | 24.2 | 24.2 | 24.2 | 23.8 | — | — | 23.7 |
|  | polyester resin | — | — | — | — | 26.8 | 26.8 | — |
|  | melamine resin[17] | 20.8 | 20.8 | 20.8 | 19.5 | 21.9 | 21.9 | 19.4 |
|  | leveling agent[18] | 0.6 | 0.6 | 0.6 | 0.6 | 0.6 | 0.6 | 0.6 |
|  | thinner[19] | 10.2 | 10.2 | 10.2 | 4.1 | 4.0 | 4.0 | 4.6 |
| Properties of paint film | 30° specular gloss | 83 | 81 | 80 | 82 | 83 | 81 | 84 |
|  | humidity resistance[20] | good | good | good | good | good | good | good |
|  | weather resistance[21] | 82 | 83 | 83 | 87 | 82 | 84 | 84 |
|  | absence or presence of bleeding[22] | absence | absence | absence | absence | absence | absence | absence |

TABLE 7(D)-1

| | | Application Example | | | | | | | | | | | |
|---|---|---|---|---|---|---|---|---|---|---|---|---|---|
| | | 49 | 50 | 51 | 52 | 53 | 54 | 55 | 56 | 57 | 58 | 59 | 60 |
| Pigment dispersing agent No.[1] | | 42 | 43 | 44 | 45 | 46 | 47 | 48 | 48 | 49 | 49 | 49 | 50 |
| Acrylic resin No.[2] | | — | AC-9 | — | — | — | AC-9 | AC-9 | — | AC-9 | — | — | AC-9 |
| Polyester resin No.[3] | | PE-1 | — | PE-1 | PE-1 | PE-1 | — | — | PE-1 | — | PE-1 | PE-2 | — |
| Formulation of dispersion paste | pigment dispersing agent | 7.5 | 16.0 | 18.8 | 5.8 | 5.8 | 5.8 | 5.8 | 6.3 | 5.8 | 9.4 | 9.4 | 12.0 |
|  | acrylic resin | — | 40.0 | — | — | — | 49.1 | 49.1 | — | 49.1 | — | — | 31.7 |
|  | polyester resin | 45.8 | — | 39.6 | 49.1 | 49.1 | — | — | 45.8 | — | 45.8 | 45.8 | — |
|  | xylene | 12.9 | 18.0 | 12.8 | 22.3 | 22.3 | 22.3 | 22.3 | 19.1 | 22.3 | 16 | 16 | — |
|  | ethyl cellosolve | — | — | — | — | — | — | — | — | — | — | — | — |
|  | butyl cellosolve | — | — | — | — | — | — | — | — | — | — | — | — |
|  | cellosolve acetate | 15.0 | 18.0 | 10 | 4.0 | 4.0 | 4.0 | 4.0 | 10 | 4.0 | 10 | 10 | 20.0 |
|  | titanium dioxide JR 602[4] | — | — | — | — | — | — | — | — | — | — | — | — |
|  | carbon black FW-200[5] | — | 8.0 | — | — | — | — | — | — | — | — | — | — |
|  | Fosterperm Yellow-H3G[6] | — | — | — | — | — | — | — | — | — | — | — | — |
|  | Fastogen Blue-RGA[7] | — | — | — | — | — | — | — | — | — | 18.8 | 18.8 | — |
|  | Paliogen Maroon L3820[8] | — | — | 18.8 | — | — | — | — | — | — | — | — | 15.0 |
|  | Rubicron Red 500RG[9] | — | — | — | — | 18.8 | — | — | — | — | — | — | — |
|  | Paliotol Red L3670[10] | — | — | — | 18.8 | — | — | — | — | — | — | — | — |
|  | Paliogen Violet L-5080[11] | — | — | — | — | — | 18.8 | — | — | — | — | — | — |
|  | Noboperm Red F3RK-70[12] | 18.8 | — | — | — | — | — | 18.8 | 18.8 | — | — | — | — |
|  | Irgazine Red BPT[13] | — | — | — | — | — | — | — | — | — | — | — | — |

| | | Application Example | | | |
|---|---|---|---|---|---|
| | | 61 | 62 | 63 | 64 |
| Pigment dispersing agent No.[1] | | 51 | 52 | 53 | 53 |
| Acrylic resin No.[2] | | AC-9 | — | AC-9 | — |
| Polyester resin No.[3] | | — | PE-2 | — | PE-1 |
| Formulation of dispersion paste | pigment dispersing agent | 6.0 | 9.4 | 9.0 | 20 |
|  | acrylic resin | 36.7 | — | 34.2 | — |
|  | polyester resin | — | 45.8 | — | 50 |
|  | xylene | 22.3 | 16 | 21.8 | 10 |
|  | ethyl cellosolve | — | — | — | — |
|  | butyl cellosolve | — | — | — | — |
|  | cellosolve acetate | 20.0 | 10 | 20.0 | 10 |
|  | titanium dioxide JR 602[4] | — | — | — | — |
|  | carbon black FW-200[5] | — | — | — | 10 |
|  | Fosterperm Yellow-H3G[6] | — | — | — | — |
|  | Fastogen Blue-RGA[7] | — | — | — | — |
|  | Paliogen Maroon L3820[8] | — | — | — | — |

TABLE 7(D)-1-continued

| | | | | |
|---|---|---|---|---|
| Rubicron Red 500RG[9] | 15.0 | — | — | — |
| Paliotol Red L3670[10] | — | 18.8 | — | — |
| Paliogen Violet L-5080[11] | — | — | 15 | — |
| Noboperm Red F3RK-70[12] | — | — | — | — |
| Irgazine Red BPT[13] | — | — | — | — |

TABLE 7(D)-2

| | | Application Example | | | | | | | | |
|---|---|---|---|---|---|---|---|---|---|---|
| | | 49 | 50 | 51 | 52 | 53 | 54 | 55 | 56 | 57 |
| Properties of paste | amount of pigment dispersing agent added (%)[14] | 20 | 100 | 40 | 20 | 20 | 20 | 20 | 20 | 20 |
| | viscosity of dispersion paste (CP)[15] | 240 | 440 | 320 | 218 | 272 | 282 | 232 | 420 | 300 |
| | storage stability of dispersion paste[16] | good | good | good | good | good | good | good | good | good |
| Formulation of paint | dispersion paste | 46.7 | 30.5 | 46.7 | 44.2 | 44.2 | 44.2 | 44.2 | 46.7 | 44.2 |
| | acrylic resin | — | 40.6 | — | — | — | 24.2 | 24.2 | — | 24.2 |
| | polyester resin | 26.8 | — | 26.8 | 24.2 | 24.2 | — | — | 26.8 | — |
| | melamine resin[17] | 21.9 | 24.4 | 21.9 | 20.8 | 20.8 | 20.8 | 20.8 | 21.9 | 20.8 |
| | leveling agent[18] | 0.6 | 0.6 | 0.6 | 0.6 | 0.6 | 0.6 | 0.6 | 0.6 | 0.6 |
| | thinner[19] | 4.0 | 3.9 | 4.0 | 10.2 | 10.2 | 10.2 | 10.2 | 4.0 | 10.2 |
| Properties of paint film | 30° specular gloss | 82 | 82 | 90 | 80 | 81 | 80 | 79 | 82 | 78 |
| | humidity resistance[20] | good | good | good | good | good | good | good | good | good |
| | weather resistance[21] | 84 | 88 | 89 | 82 | 83 | 83 | 84 | 80 | 83 |
| | absence or presence of bleeding[22] | absence | absence | absence | absence | absence | absence | absence | absence | absence |

| | | Application Example | | | | | | |
|---|---|---|---|---|---|---|---|---|
| | | 58 | 59 | 60 | 61 | 62 | 63 | 64 |
| Properties of paste | amount of pigment dispersing agent added (%)[14] | 20 | 20 | 40 | 20 | 20 | 30 | 100 |
| | viscosity of dispersion paste (CP)[15] | 700 | 810 | 490 | 260 | 510 | 340 | 490 |
| | storage stability of dispersion paste[16] | good | good | good | good | good | good | good |
| Formulation of paint | dispersion paste | 46.7 | 46.7 | 51.7 | 52.0 | 46.7 | 51.7 | 25.9 |
| | acrylic resin | — | — | 23.7 | 23.8 | — | 23.7 | — |
| | polyester resin | 26.8 | 26.8 | — | — | 26.8 | — | 43.1 |
| | melamine resin[17] | 21.9 | 21.9 | 19.4 | 19.5 | 21.9 | 19.4 | 25.9 |
| | leveling agent[18] | 0.6 | 0.6 | 0.6 | 0.6 | 0.6 | 0.6 | 0.6 |
| | thinner[19] | 4.0 | 4.0 | 4.6 | 4.1 | 4.0 | 4.6 | 4.5 |
| Properties of paint film | 30° specular gloss | 81 | 82 | 81 | 81 | 82 | 80 | 80 |
| | humidity resistance[20] | good | good | good | good | good | good | good |
| | weather resistance[21] | 84 | 84 | 86 | 86 | 84 | 84 | 83 |
| | absence or presence of | absence | absence | absence | absence | absence | absence | absence |

TABLE 7(D)-2-continued bleeding[22]

Note:
[1] pigment dispersing agent of Examples (Tables 5 and 6)
[2] acrylic resin for film formation in Table 2
[3] polyester resin for film formation in Table 1
[4] titanium dioxide JR-602 (made by Teikoku Kako K.K., trade name)
[5] carbon black FR-200 (made by Degussa AG, trade name)
[6] Fosterparm Yellow H3G (benzimidazolone series organic pigment, made by Hoechst, trade name)
[7] Fastogen Blue RGA (copperphthalocyanine series organic pigment, made by Dainippon Ink & Chemicals, Inc., trade name)
[8] Paliogen Maroon L3820 (perylene series organic pigment, made by BASF Ag, trade name)
[9] Rubicron Red 500RG (quinacridone series organic pigment, made by Toso K.K., trade name)
[10] Paliotol Red L3670 (perylene series organic pigment, made by BASF AG, trade name)
[11] Paliogen Violet L-5080 (thioindigo series organic pigment, made by BASF AG, trade name)
[12] Noboperm Red F3RK-70 (azo series organic pigment, made by Hoechst, trade name)
[13] Irgazine Red BPT (perylene series organic pigment, made by Ciba Geigy, trade name)
[14] amount of pigment dispersing agent added as solid content on pigment (%)
[15] paste viscosity: measured by means of B-type viscometer at 20° C. (unit: CP)
[16] After the dispersion paste was left to stand at 50° C. for 5 days, the viscosity was measured at 20° C. by means of B-type viscometer (trade name, made by Tokyo Keiki K.K.). When the ratio of initial viscosity to viscosity after 5 days is within a range of 0.9-1.4, the storage stability is good, while when it exceeds 2.0, the property is poor.
[17] melamine resin: Uban 220 (made by Mitsui Toatsu Chemicals, Inc., trade name, nonvolatile content: 60%)
[18] leveling agent: Modaflow (made by Monsanto Co., trade name, 10% xylene solution)
[19] thinner for dilution: cellosolve acetate/xylene = 50/50%
[20] Humidity test After the test sheet was held at 50 ± 1° C. in a moisture atmosphere of not less than 95% RH for 120 hours, it was taken out from the above atmosphere and left to stand for 24 hours. The good or bad humidity resistance was evaluated by the size and density of resulting blister.
[21] The 60° specular gloss was measured by means of a sunshine carbon weathermeter after the sheet was exposed for 1000 hours according to a method for weather acceleration test of JIS D0205-7.6. The property was represented by the gloss retention (%).
[22] Test for judgment of bleeding After the cured film was rubbed with a methanol impregnated cloth several times, the film gloss or glossy feeling was judged by the presence or absence of bleeding.
no change: no bleeding
enhancement of gloss: presence of bleeding

TABLE 8(A)-1

| | | Comparative Example No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Pigment dispersing agent No. | | 54 | 55 | 56 | 57 | 58 | 59 | 60 | 61 | 62 | 63 | 64 | 65 | 66 |
| Solvent | xylene | — | — | — | 10 | — | — | — | — | — | — | — | — | — |
| | butanol | 18.0 | 2.2 | 18.0 | 19.9 | 2.5 | 0.54 | 20.75 | 19.8 | 1.1 | 4.5 | 1.84 | 2.5 | 3.6 |
| | methanol | — | — | — | — | — | — | — | — | — | — | — | — | — |
| Component A | imino bispropyl amine | — | — | — | — | — | — | — | — | — | — | — | — | — |
| | triethylene tetramine | — | — | — | — | — | — | — | — | — | — | — | — | — |
| | Epomine SP006 | — | — | — | — | — | — | — | 0.94 | — | — | — | 3.75 | — |
| | Epomine SP012 | — | — | — | — | — | — | 0.77 | — | 1.2 | — | — | — | 5.5 |
| | Epomine SP018 | 1.9 | 3.4 | 1.9 | 19.9 | 3.77 | 0.36 | — | — | — | 1.4 | 2.86 | — | — |
| | Epomine SP200 | — | — | — | — | — | — | — | — | — | — | — | — | — |
| | Epomine SP300 | — | — | — | — | — | — | — | — | — | — | — | — | — |
| | polypropylene polyamine PA06 | — | — | — | — | — | — | — | — | — | — | — | — | — |
| Component B | component B No. | B$_1$-8 | B$_3$-11 | B$_1$-9 | B$_2$-21 | B$_3$-12 | B$_1$-10 | B$_3$-14 | B$_3$-15 | B$_2$-25 | B$_2$-25 | B$_3$-13 | — | — |
| | formulating amount | 80.1 | 75.5 | 80.1 | 50.2 | 85.36 | 99.1 | 78.48 | 79.26 | 97.7 | 79.1 | 79.4 | — | — |
| Component C | component C No. | — | C$_2$-4 | — | — | C$_2$-6 | — | — | — | — | C$_4$ | C$_2$-4 | C$_2$-4 | C$_6$ |
| | formulating amount | — | 18.9 | — | — | 8.37 | — | — | — | — | 15.0 | 15.9 | 93.75 | 90.9 |

TABLE 8(A)-2

| | | Comparative Example No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Properties | A/B mol ratio | 1/1.8 | 1/1.7 | 1/1.8 | 1/1.8 | 1/16 | 1/1.8 | 1/3 | 1/2 | 1/2 | 1/2 | 1/2 | — | — |
| | A/C mol ratio | — | 1/2.0 | — | — | 1/3 | — | — | — | — | 1/2 | 1/2 | 1/1.8 | 1/4 |
| | amine value | 40 | 59 | 40 | 420 | 66 | 9 | 20 | 24 | 25 | 29 | 49 | 66 | 96 |
| | nonvolatile content (%) | 50 | 60 | 50 | 50 | 60 | 40 | 40 | 40 | 50 | 50 | 60 | 60 | 60 |
| | hydroxyl value of component B | 30 | 52 | 37 | 54 | 54 | 30 | 0 | 0 | 0 | 0 | 0 | 0 | 0 |
| | molecular weight of component B | 25,200 | 22,300 | 25,000 | 1,520 | 1,530 | 110,000 | 21,100 | 12,500 | 25,700 | 25,700 | 24,300 | — | — |
| | number of reactive groups in component B | 0.5 | 0.2 | 4.4 | 1.0 | 1.2 | 1.1 | 1.2 | 1.1 | 1.0 | 1.0 | 1.2 | — | — |
| | molecular weight of component C | — | 5,120 | — | — | 800 | — | — | — | — | 6,000 | 5,120 | 5,120 | 2,960 |
| Reaction conditions | A-B reaction temperature (°C.) | 120 | 80 | 120 | 120 | 60 | 120 | 80 | 80 | 60 | 60 | 80 | — | — |
| | A-B reaction time (Hr) | 4 | 5 | 3 | 4 | 2 | 4 | 5 | 5 | 2 | 2 | 5 | — | — |
| | A-C reaction temperature (°C.) | — | 30 | — | — | 60 | — | — | — | — | 30 | 60 | 60 | 60 |
| | A-C reaction time (Hr) | — | 2 | — | — | 2 | — | — | — | — | 2 | 2 | 2 | 2 |
| Fluid property | | good | good | gel | good | good | good | good | good | good | good | good | good | good |

TABLE 9(A)-1

| | | Comparative Application Example | | | | | | | |
|---|---|---|---|---|---|---|---|---|---|
| | | 1 | 2 | 3 | 4 | 5 | 6 | 7 | 8 |
| Pigment dispersing agent No. | | 54 | 55 | 57 | 58 | 59 | 60 | 61 | — |
| Acrylic resin No. | | AC-3 | AC-8 | AC-3 | — | AC-3 | AC-8 | AC-8 | AC-8 |
| Polyester resin No. | | — | — | — | PE-1 | — | — | — | — |
| Formulation of dispersion paste | pigment dispersing agent | 15 | 5.8 | 15 | 5.8 | 18.8 | 22.5 | 22.5 | — |
| | acrylic resin | 29.2 | 49.1 | 29.2 | — | 29.2 | 24.7 | 24.7 | 62.7 |
| | polyester resin | — | — | — | 49.1 | — | — | — | — |
| | xylene | 20.8 | 22.3 | 20.8 | 22.3 | 17.0 | 20.0 | 20.0 | 9.2 |
| | ethyl cellosolve | — | — | — | — | — | — | — | 9.3 |
| | cellosolve acetate | 20.0 | 4.0 | 20.0 | 4.0 | 20.0 | 17.8 | 17.8 | — |
| | titanium dioxide JR 602 | — | — | — | — | — | — | — | — |
| | carbon black FW-200 | — | — | — | — | — | — | — | — |
| | Fosterperm Yellow-H3G | — | — | — | — | — | — | — | — |
| | Fastogen Blue-RGA | — | — | — | — | — | — | — | — |
| | Paliogen Maroon L3820 | 15.0 | — | 15.0 | — | 15.0 | — | — | — |
| | Rubicron Red 500RG | — | — | — | — | — | — | — | — |
| | Paliotol Red L3670 | — | — | — | 18.8 | — | — | — | 18.8 |
| | Noboperm Red F3RK-70 | — | 18.8 | — | — | — | 15.0 | 15.0 | — |
| | Paliogen Violet L-5080 | — | — | — | — | — | — | — | — |

TABLE 9(A)-2

| | | Comparative Application Example | | | | | | | |
|---|---|---|---|---|---|---|---|---|---|
| | | 1 | 2 | 3 | 4 | 5 | 6 | 7 | 8 |
| Properties of paste | amount of pigment dispersing agent added | 50 | 20 | 50 | 20 | 50 | 60 | 60 | 0 |
| | viscosity of dispersion paste (CP) | 12,400 | 8,750 | 9,700 | 10,300 | 14,300 | 2,200 | 4,600 | gel |
| | storage stability of dispersion paste | poor | poor | poor | poor | poor | good | good | poor |
| Formulation of paint | dispersion paste | 52.0 | 44.2 | 52.0 | 44.2 | 52.0 | 52.0 | 52.0 | 44.2 |
| | acrylic resin | 23.8 | 24.2 | 23.8 | — | 23.8 | 23.8 | 23.8 | 29.0 |
| | polyester resin | — | — | — | 24.2 | — | — | — | — |
| | melamine resin | 19.5 | 20.8 | 19.5 | 20.8 | 19.5 | 19.5 | 19.5 | 20.8 |
| | leveling agent | 0.6 | 0.6 | 0.6 | 0.6 | 0.6 | 0.6 | 0.6 | 0.6 |
| | thinner | 4.1 | 10.2 | 4.1 | 10.2 | 4.1 | 4.1 | 4.1 | 5.4 |
| Properties of paint film | 30° specular gloss | 32 | 64 | 30 | 51 | 21 | 82 | 80 | 56 |
| | humidity resistance | good | good | good | good | good | occurrence of blister | occurrence of blister | good |
| | weather resistance | 80 | 85 | 78 | 81 | 80 | 58 | 58 | 85 |
| | absence or presence of bleeding | absence | absence | absence | absence | absence | presence | presence | absence |

TABLE 9(B)-1

| | | Comparative Application Example | | | | | | | |
|---|---|---|---|---|---|---|---|---|---|
| | | 9 | 10 | 11 | 12 | 13 | 14 | 15 | 16 |
| Pigment dispersing agent No. | | 62 | 63 | 64 | 65 | 66 | 2 | 22 | — |
| Acrylic resin No. | | AC-8 | AC-9 | AC-9 | AC-9 | AC-8 | — | — | — |
| Polyester resin No. | | — | — | — | — | — | PE-2 | PE-1 | PE-2 |
| Formulation of dispersion paste | pigment dispersing agent | 12.0 | 21.0 | 11.6 | 5.8 | 7.5 | 6.0 | 9.0 | — |
| | acrylic resin | 31.7 | 24.2 | 43.3 | 49.1 | 34.2 | — | — | — |
| | polyester resin | — | — | — | — | — | 36.7 | 34.2 | 41.7 |
| | xylene | 21.3 | 19.8 | 22.3 | 22.3 | 23.3 | 22.3 | 21.8 | 23.3 |
| | ethyl cellosolve | — | — | — | — | — | — | — | — |
| | cellosolve acetate | 20.0 | 20.0 | 4.0 | 4.0 | 20.0 | 20.0 | 20.0 | 20.0 |
| | titanium dioxide JR 602 | — | — | — | — | — | — | — | — |
| | carbon black FW-200 | — | — | — | — | — | — | — | — |
| | Fosterperm Yellow-H3G | — | — | — | — | 15.0 | — | — | — |
| | Fastogen Blue-RGA | — | — | — | — | — | — | — | — |
| | Paliogen Maroon L3820 | — | 15.0 | — | — | — | — | — | — |
| | Rubicron Red 500RG | 15.0 | — | — | — | — | — | — | — |
| | Paliotol Red L3670 | — | — | — | — | — | — | — | — |
| | Noboperm Red F3RK-70 | — | — | 18.8 | — | — | 15.0 | — | 15.0 |
| | Paliogen Violet L-5080 | — | — | — | 18.8 | — | — | 15.0 | — |

TABLE 9(B)-2

| | | Comparative Application Example | | | | | | | |
|---|---|---|---|---|---|---|---|---|---|
| | | 9 | 10 | 11 | 12 | 13 | 14 | 15 | 16 |
| Properties of paste | amount of pigment dispersing agent added | 40 | 70 | 40 | 20 | 30 | 20 | 30 | 20 |
| | viscosity of dispersion paste (CP) | 1,060 | 1,620 | 820 | 2,430 | 9,700 | 4,100 | 2,200 | 17,600 |
| | storage stability of | good | good | good | poor | poor | poor | poor | poor |

TABLE 9(B)-2-continued

|  |  | Comparative Application Example | | | | | | | |
|---|---|---|---|---|---|---|---|---|---|
|  |  | 9 | 10 | 11 | 12 | 13 | 14 | 15 | 16 |
| Formulation of paint | dispersion paste | | | | | | | | |
| | dispersion paste | 52.0 | 51.7 | 44.2 | 44.2 | 51.7 | 52.0 | 51.7 | 52.0 |
| | acrylic resin | 23.8 | 23.7 | 24.2 | 24.2 | 23.7 | — | — | — |
| | polyester resin | — | — | — | — | — | 23.8 | 23.7 | 23.8 |
| | melamine resin | 19.5 | 19.4 | 20.8 | 20.8 | 19.4 | 19.5 | 19.4 | 19.5 |
| | leveling agent | 0.6 | 0.6 | 0.6 | 0.6 | 0.6 | 0.6 | 0.6 | 0.6 |
| | thinner | 4.1 | 4.6 | 10.2 | 10.2 | 4.6 | 4.1 | 4.6 | 4.1 |
| Properties of paint film | 30° specular gloss | 84 | 72 | 78 | 25 | 42 | 28 | 15 | 21 |
| | humidity resistance | occurrence of blister | occurrence of blister | occurrence of blister | glossless | glossless | good | good | good |
| | weather resistance | 62 | 68 | 65 | 68 | 78 | 89 | 90 | 60 |
| | absence or presence of bleeding | presence | presence | presence | presence | presence | absence | absence | absence |

What is claimed is:

1. A pigment dispersing agent consisting of a product obtained by reacting
   (1) an amine compound having (a) at least one amino group or (b) at least two imino groups or (c) at least one amino group and at least one imino group, a weight average molecular weight of about 60 to about 30,000, and an amine value of about 50 to about 2,000 mg KOH/mg.
   (2) an acrylic polymer having a weight average molecular weight of about 2,000 to about 100,000, a hydroxyl value of about 5 to about 200, and one of a glycidyl group, an acetoacetoxy group, and a cyclocarbonate group in a functional group number of about 0.7 to about 3.0 on average per molecule as a side chain, provided that 1 mol of glycidyl group is deemed to be 1 mol of hydroxyl group when calculating the hydroxyl value, and
   (3) a polyester resin having (a) a weight average molecular weight of about 1,000 to about 30,000, (b) a terminal isocyanate group or terminal acetoacetoxy group, and (c) one of the formula selected from the group consisting of $R_1-O-(CO-R_2-O)_n-CO-NH-R_3-NCO,$ $R_1-O-(CO-R_2-O)_n-CO-CH_2-CO-CH_3,$ $R_1-O-(CO-R_4-COO-CHR_5-CHR_6-O)_n-$
$-CO-NH-R_3-NCO,$ $R_1-O-(CO-R_4-COO-CHR_5-CHR_6-O)_n-$
$-CO-CH_2-CO-CH_3,$ $R_1-CO-(O-CHR_5-CHR_6-O-COR_4-CO)_n-$
$-O-CHR_5-CHR_6-OCO-NH-R_3-NCO,$ and $R_1-CO-(O-CHR_5-CHR_6-O-COR_4-CO)_n-$
$-O-CHR_5-CHR_6-OCO-CH_2COCH_3$ wherein $R_1$ is a $C_1-C_{18}$ aliphatic or alicyclic hydrocarbon group or a $C_6-C_{18}$ aromatic hydrocarbon group,
$R_2$ is a $C_1-C_7$ alkylene group,
$R_3$ is a $C_6-C_{20}$ residual group of an aliphatic, alicyclic, or aromatic diisocyanate group,
$R_4$ is a $C_2-C_{20}$ residual group of an aliphatic or alicyclic, anhydride or a $C_6-C_{20}$ residual group of an aromatic acid anhydride,
$R_5$ and $R_6$ are each a hydrogen atom, a $C_1-C_{20}$ aliphatic hydrocarbon group, a $C_1-C_{20}$ alicyclic hydrocarbon group, a $C_6-C_{20}$ aromatic hydrocarbon group, a $-CH_2-O-R_1$ group, or a $-CH_2-OCO-R_1$ group where $R_1$ is as previously defined, and
n is an integer of at least 1,
the mol ratio of the amino compound to the acrylic polymer to the polyester resin being from 1:1:1 to 1:40:40, and
the bridge between the amine compound amino and/or imino nitrogen and the acrylic copolymer being

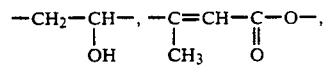

and

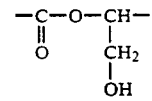

depending on whether the copolymer contains a glycidyl group, an acetoacetoxy group, or a cyclocarbonate group, respectively.

2. The pigment dispersing agent of claim 1 wherein the acrylic copolymer contains a glycidyl group.

3. The pigment dispersing agent of claim 1 wherein the acrylic copolymer contains an acetoacetoxy group.

4. The pigment dispersing agent of claim 1 wherein the acrylic copolymer contains a cyclocarbonate group.

* * * * *